United States Patent
Hamlin et al.

(10) Patent No.: US 10,572,694 B2
(45) Date of Patent: Feb. 25, 2020

(54) EVENT-BASED DISPLAY INFORMATION PROTECTION SYSTEM

(71) Applicant: Dell Products L.P., Round Rock, TX (US)

(72) Inventors: Daniel L. Hamlin, Round Rock, TX (US); Charles D. Robison, Jr., Buford, GA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/943,440

(22) Filed: Apr. 2, 2018

(65) Prior Publication Data

US 2018/0225481 A1    Aug. 9, 2018

Related U.S. Application Data

(63) Continuation of application No. 14/814,006, filed on Jul. 30, 2015, now Pat. No. 9,953,191.

(51) Int. Cl.
*G06F 21/00* (2013.01)
*G06F 21/84* (2013.01)

(52) U.S. Cl.
CPC ........ *G06F 21/84* (2013.01); *G06F 2221/032* (2013.01)

(58) Field of Classification Search
CPC ...... G06F 21/62; G06F 21/6209; G06F 21/84; G06F 21/6218; G06F 21/6245; G06F 2221/032
See application file for complete search history.

(56) References Cited

U.S. PATENT DOCUMENTS

| | | | |
|---|---|---|---|
| 2004/0001101 A1* | 1/2004 | Trajkovic | G06F 3/147 715/781 |
| 2012/0226912 A1* | 9/2012 | King | G06F 21/31 713/183 |
| 2013/0074006 A1* | 3/2013 | Szeto | G06F 21/62 715/800 |
| 2014/0297719 A1* | 10/2014 | Laasik | H04L 67/10 709/203 |
| 2015/0070516 A1* | 3/2015 | Shoemake | H04N 21/42203 348/207.11 |
| 2015/0220737 A1* | 8/2015 | Rothman | G06F 21/572 726/1 |

(Continued)

*Primary Examiner* — Yogesh Paliwal
(74) *Attorney, Agent, or Firm* — Haynes and Boone, LLP

(57) ABSTRACT

A display information protection system includes a management system that stores a plurality of display information protection policies and that may provide any of the display information protection policies through a network. An endpoint device is coupled to the management system through the network and stores a display information protection policy that may have been automatically populated or received from the management system. The endpoint device displays a plurality of information and may determine that a first subset of the plurality of information that has been provided for display is defined by the display information protection policy. In response to detecting the first display information protection event and determining that the first subset of a plurality of information is defined by the display information protection policy, the endpoint device obfuscates the display of the first subset of the plurality of information on the endpoint device.

20 Claims, 17 Drawing Sheets

(56) References Cited

U.S. PATENT DOCUMENTS

2016/0094495 A1\* 3/2016 Ahuja .................... H04L 51/12
                                                    715/753
2017/0032150 A1   2/2017 Hamlin et al.

\* cited by examiner

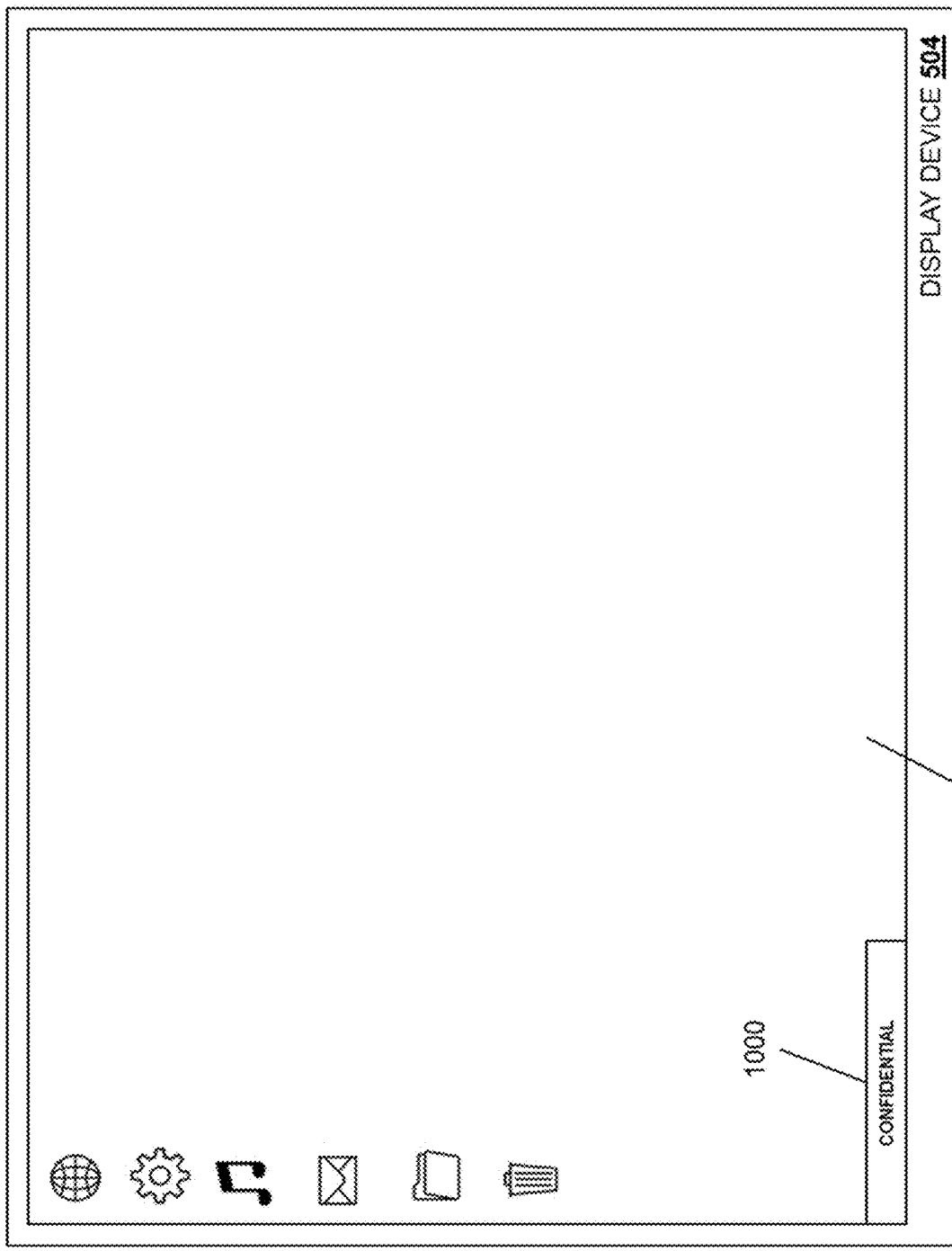

EVENT-BASED DISPLAY INFORMATION PROTECTION SYSTEM

CROSS-REFERENCE TO RELATED APPLICATIONS

This is a Continuation application to U.S. Utility application Ser. No. 14/814,006 filed Jul. 30, 2015, entitled "EVENT-BASED DISPLAY INFORMATION PROTECTION SYSTEM,", the disclosure of which is incorporated herein by reference in its entirety.

BACKGROUND

The present disclosure relates generally to information handling systems, and more particularly to event-based protection of information displayed on an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, desktop computers, laptop/notebook computers, tablet computers, mobile phones, and/or other computing systems are often used to handle sensitive information, and when doing so, it is desirable to implement security policies to ensure that such sensitive information cannot be accessed by unauthorized users. The vast majority of conventional information security systems focus on the security of information entering and leaving the computing system, including authentication of the user using the computing system, encryption/decryption of the information leaving/entering the computing system, and/or other information security functionality known in the art. However, there exist a variety of situations and events that are not addressed by such information security systems in which sensitive information located on such computing systems may be compromised. For example, an authorized user of the computing system may leave the computing system unattended while it is displaying sensitive information, and an unauthorized user may then be able to view that sensitive information. In another example, an unauthorized user may view the displayed sensitive information from behind an authorized user while that authorized user is at the computing system. In yet another example, an authorized user may "share" their screen (i.e., transmit the information being displayed on their computing system) across a network with the computing system of an unauthorized user while the computing system of the authorized user is displaying sensitive information. These and other situations risk the compromise of sensitive information to unauthorized users.

Accordingly, it would be desirable to provide an improved display information protection system.

SUMMARY

According to one embodiment, an information handling system (IHS) include a primary display device; a database storing a display information protection policy; a processing system that is coupled to the primary display device and the database; and a memory system that is coupled to the processing system and that includes instruction that, when executed by the processing system, cause the processing system to provide a display information protection engine that is configured to: display a plurality of information on the primary display device; determine that a first subset of the plurality of information that has been provided for display on the primary display device is defined by the display information protection policy in the database; detect a display information protection event; and in response to detecting the display information protection event and determining that the first subset of a plurality of information is defined by the display information protection policy, obfuscate the display of the first subset of the plurality of information on the primary display device.

BRIEF DESCRIPTION OF THE DRAWINGS

FIG. 15A is a screen shot illustrating an embodiment of a display screen on the endpoint device of FIG. 7 performing a protection action on sensitive information that was being displayed on the display screen.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
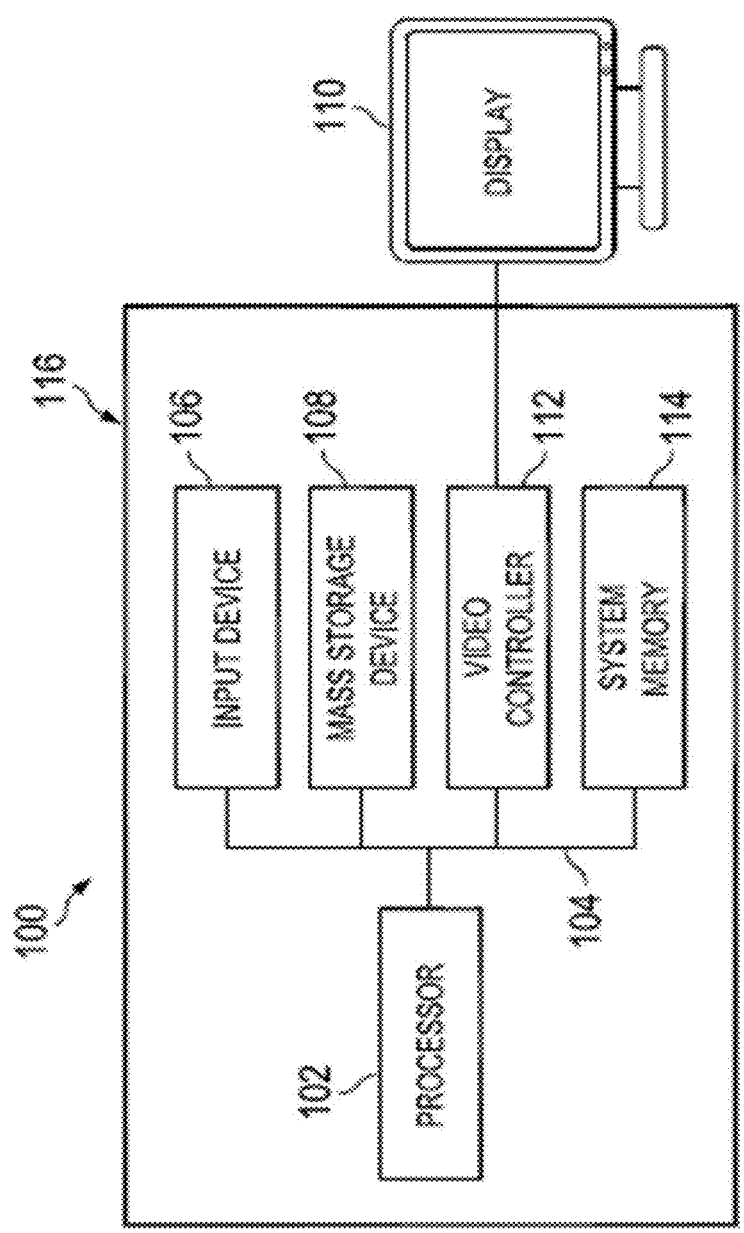
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
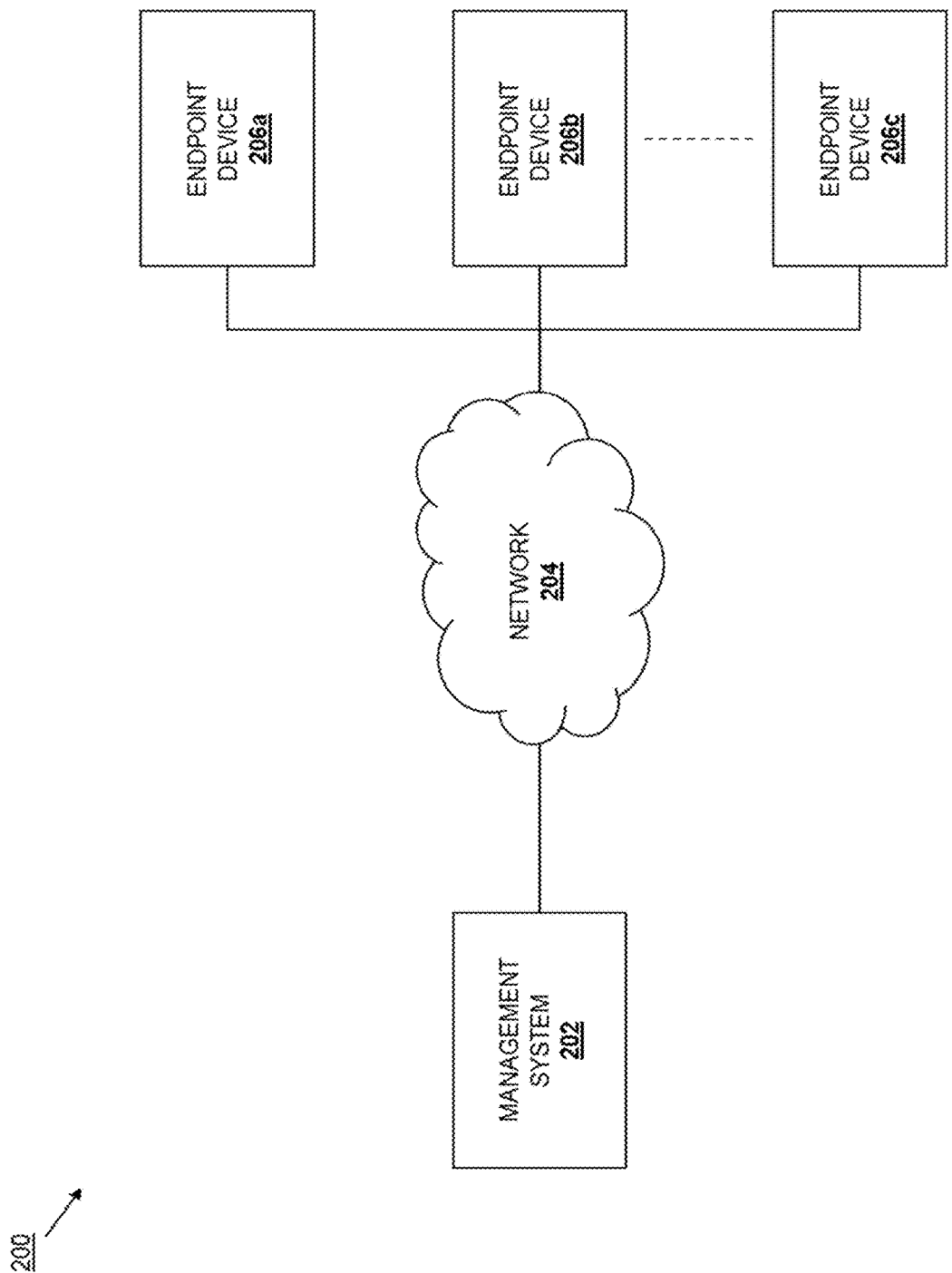
FIG. 2 is a schematic view illustrating an embodiment of an event-based display information protection system.

Referring now to FIG. 2, an embodiment of an event-based display information protection system 200 is illustrated. In the embodiments discussed below, the event-based display information protection system 200 is often discussed as being implemented in a corporate network such as, for example, a Local Area Network (LAN) provided by a corporation or business with a plurality of employees that utilize computing devices. However, one of skill in the art will recognize that the teachings of the present disclosure may be applied to home networks, personal device (i.e., not associated with or provided by a corporate entity), mobile devices, and/or other computing systems while remaining within the scope of the present disclosure. In the illustrated embodiment, the event-based display information protection system 200 includes a management system 202 that is coupled through a network 204 to a plurality of endpoint devices 206a, 206b, and up to 206c. As discussed below, each of the management system 202 and the endpoints devices 206a-c may be provided by one of the IHSs 100 discussed above with reference to FIG. 1. For example, the management system 202 may be corporate server, the endpoint devices 206a-c may be desktop computing systems, laptop/notebook computing systems, tablet computing systems, mobile phones, and/or other corporate-issued computing device known in the art, and the network 204 may be a LAN, the Internet, and/or other networks or network combinations known in the art. However, a variety of other configurations and devices for the event-based display information protection system 200 will fall within the scope of the present disclosure.

Figure 3:
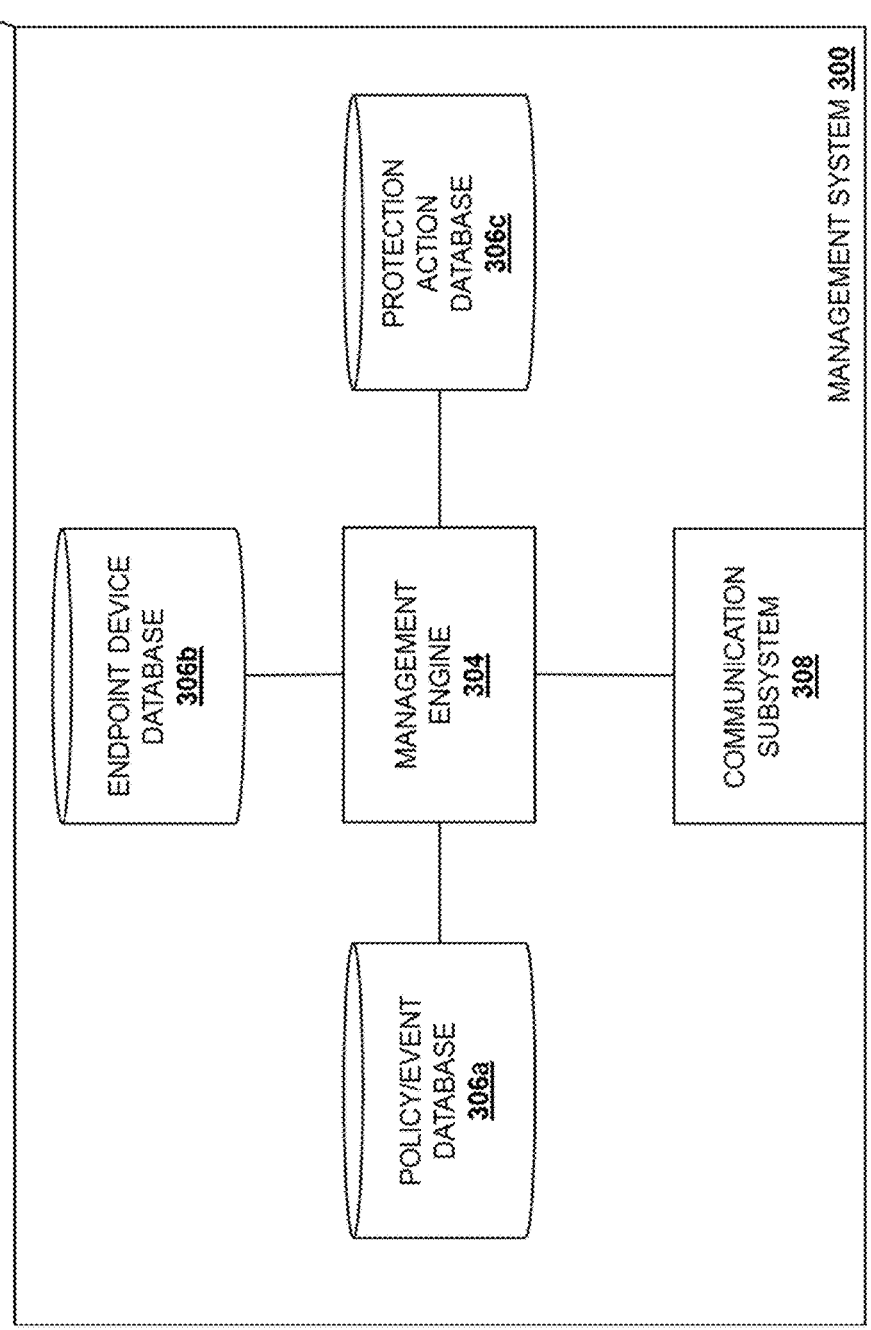
FIG. 3 is a schematic view illustrating an embodiment of a management system used in the event-based display information protection system of FIG. 2.

Referring now to FIG. 3, an embodiment of a management system 300 is illustrated. In an embodiment, the management system 300 may be the management system 202 discussed above with reference to FIG. 2. As such, the management system 300 may be provided by the IHS 100 discussed above with reference to FIG. 1 and/or may include some or all of the components of the IHS 100. In the illustrated embodiment, the management system 300 includes a chassis 302 that houses the components of the management system 302, only some of which are illustrated in FIG. 3. For example, the chassis 302 may house a processing system (not illustrated, but which may be provided by the processor 102 discussed above with reference to FIG. 1) and a memory system (not illustrated, but which may be provided by the system memory 114 discussed above with reference to FIG. 1) that include instructions that, when executed by the processing system, cause the processing system to provide a management engine 304 that performs the functions of the management engines and management systems discussed below. The chassis 302 may also house one or more storage systems (not illustrated, but which may be provided by the storage device 108 discussed above with reference to FIG. 1) that are coupled to the management engine 304 (e.g., via a coupling between the processing system and the storage system(s)) and that store one or more databases.

In the illustrated example, those one or more databases include a policy/event database 306a, an endpoint device database 306b, and a protection action database 306c. As discussed in further detail below, the policy event database 306a may store display information protection policies and display information protection events (which may be, for example, generated, defined, and/or otherwise provided by a corporate network administrator), the endpoint device database 306b may store information about endpoint devices accessible through the network 204 (e.g., endpoint devices in the corporate LAN), and the protection action database 306c may store display information protection actions (which may be, for example, populated, defined, and/or otherwise provided by a corporate network administrator). While a few specific databases have been illustrated and described as separate databases included in the chassis 302 of the management system 300, one of skill in the art in possession of the present disclosure will recognize that those databases may be combined, further separated, and/or located outside the chassis 302 of the management system 300 (i.e., coupled to the management engine 304 through the network 204) while remaining within the scope of the present disclosure. The management engine 304 is also coupled to a communication subsystem 308 such as a network interface controller (NIC) or wireless communication device (e.g., via a coupling between the processing system and the communication subsystem 308) that is coupled to the network 204 and configured to allow the management engine 304 to communicate through the network 204 with the endpoint devices 206a-c.

Figure 4:
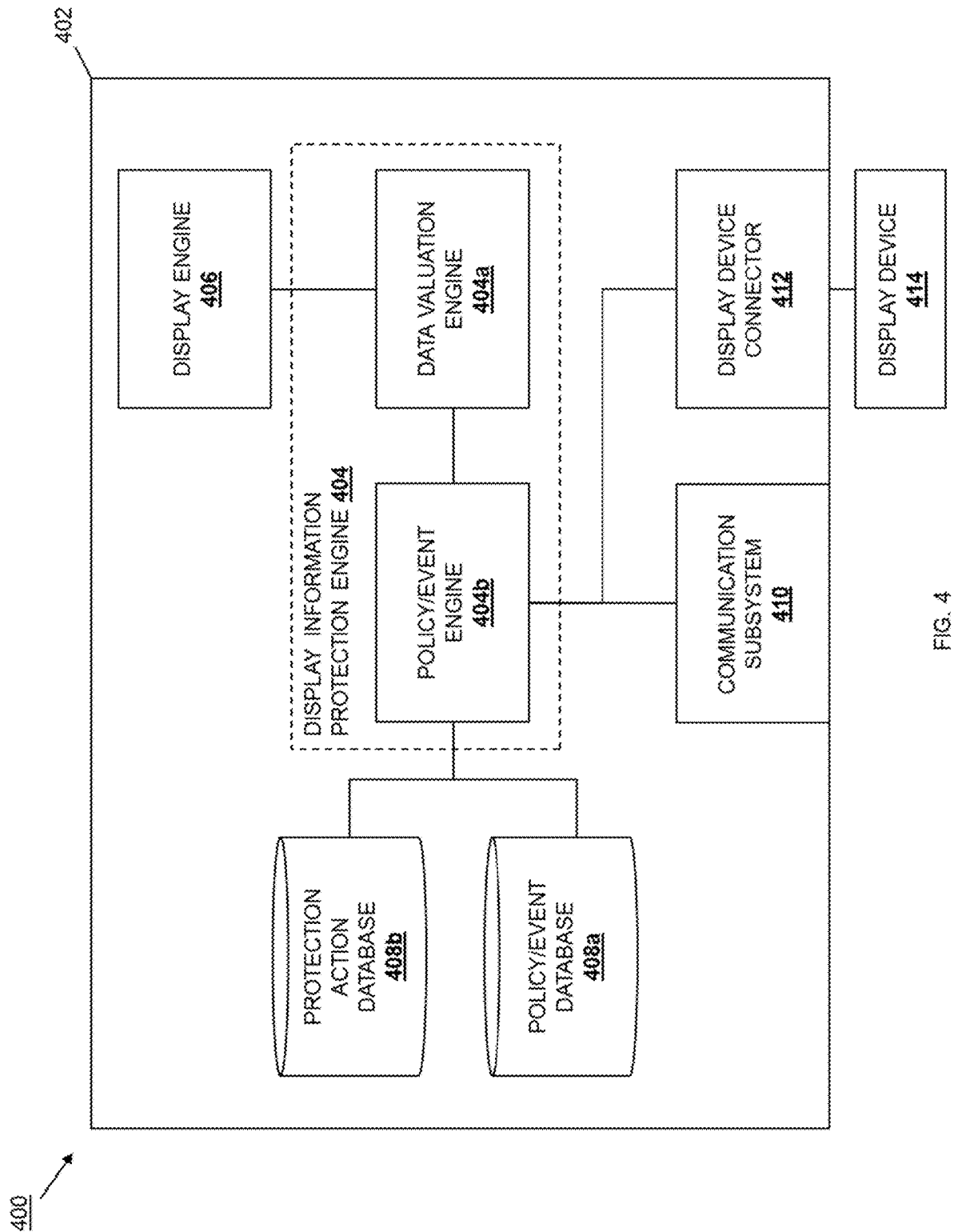
FIG. 4 is a schematic view illustrating an embodiment of an endpoint device used in the event-based display information protection system of FIG. 2

Referring now to FIG. 4, an embodiment of an endpoint device 400 is illustrated. In an embodiment, the endpoint device 400 may be any of the endpoint devices 206a-c discussed above with reference to FIG. 2. As such, the endpoint device 400 may be provided by the IHS 100 discussed above with reference to FIG. 1 and/or may include some or all of the components of the IHS 100. In the illustrated embodiment, the endpoint device 400 includes a chassis 402 that houses the components of the endpoint device 400, only some of which are illustrated in FIG. 4. For example, the chassis 402 may house a processing system (not illustrated, but which may be provided by the processor 102 discussed above with reference to FIG. 1) and a memory system (not illustrated, but which may be provided by the system memory 114 discussed above with reference to FIG. 1) that include instructions that, when executed by the processing system, cause the processing system to provide a display information protection engine 404 that performs the functions of the display information protection engines and endpoint devices discussed below. In the illustrated embodiment, the display information protection engine 404 is provided by a data valuation engine 404a and a policy/event engine 404b. As discussed below, the data valuation engine 404a is configured to determine the content, sensitivity, and/or value of information for which instructions have been provided to display that information on a display device, and the policy/event engine 404b is configured to detect display information protection events and apply policies to information for which instructions have been provided to display that information on a display device. However, while the data valuation engine 404a and the policy/event engine 404b are illustrated and described as two separate engines, they may be combined into a single engine, or have their functionality split into other engines while remaining within the scope of the present disclosure.

The memory system may also include instructions that, when executed by the processing system, cause the processing system to provide a display engine 406 that performs the functions of the display engines and endpoint devices discussed below. For example, the processing system may include a graphics processing system (e.g., a central processing unit (CPU), a graphics processing unit (GPU) provided on a video card, etc.) that is configured to receive instructions from a user and/or application running on the endpoint device 400 to provide information for display on a display device, and performs processing functions to provide that information for display on the display device. The display engine 406 is coupled to the display information protection engine 404 (and specifically the data valuation engine 404a in the illustrated embodiment) either via a connection between processing subsystems in the processing system or due to a processing system providing both the display engine 406 and the display information protection engine 404. Furthermore, similarly as discussed above, in some embodiments the display engine 406 may be combined with the display information protection engine 404 while remaining within the scope of the present disclosure.

The chassis 402 may also house one or more storage systems (not illustrated, but which may be provided by the storage device 108 discussed above with reference to FIG. 1) that are coupled to the display information protection engine 404 (e.g., via a coupling between the processing system and the storage system(s)) and that store one or more databases. In the illustrated example, those one or more databases include a policy/event database 408a, and a protection action database 408b. As discussed in further detail below, the policy event database 408a may store display information protection policies and display information protection events (which may be, for example, automatically populated by the policy/event engine 404b, received from the management system 202/300, defined by a user of the endpoint device 400, etc.), and the protection action database 408b may store display information protection actions (which may be, for example, automatically populated by the policy/event engine 404b, received from the management system 202/300, defined by a user of the endpoint device 400, etc.) While a few specific databases have been illustrated and described as separate databases included in the chassis 402 of the endpoint device 400, one of skill in the art in possession of the present disclosure will recognize that those databases may be combined, further separated, and/or located outside the chassis 402 of the endpoint device 400 (i.e., coupled to the policy/event engine 404b through the network 204) while remaining within the scope of the present disclosure.

In some embodiments, the chassis 402 may house a hardware-based storage system that may include the policy/event database 408a, the protection action database 408b, and/or that may store the policies, events, and actions described below. That hardware-based storage system may be a secure storage system that requires authentication by the processing system (i.e., by the policy/event engine 404b) for access and retrieval of the policies, events, and/or actions stored therein. For example, the hardware-based storage system that includes the databases 408a and 408b and/or stores the policies, events, and actions utilized by the policy/event engine 404b may be provided by a CONTROLVAULT™ system available from Dell, Inc. of Round Rock, Tex. However, other hardware-based storage systems that are configurable to provide for secure access by the policy/event engine 404b to the policies, events, and actions in the databases 408a and 408b will fall within the scope of the present disclosure.

The policy/event engine 404b is also coupled to a communication subsystem 410 such as a network interface controller (NIC) or wireless communication device (e.g., via a coupling between the processing system and the communication subsystem 410) that is coupled to the network 204 and configured to allow the policy/event engine 404b to communicate through the network 204 with the management system 202/300. The policy/event engine 404b is also coupled to a display device connector 412 (e.g., via a coupling between the processing system and the display device connector 412) that is coupled to a display device 414 that may be the display 110 discussed above with reference to FIG. 1. While the display device 414 is illustrated and described below as an externally connected display device 414 that is connected to the display device connector 412 on the chassis 402 of the endpoint device 400, one of skill in the art in possession of the present disclosure will recognize that the display device 414 may be integrated with the chassis 402 of the endpoint device 400 (e.g., as with laptop/notebook computing systems, tablet computing systems, mobile phones, etc.) and thus the connection between the display device 414 and the display device connector 412 may be internal to the chassis 402 of the endpoint device 400. Furthermore, as discussed in further detail below, more than one display device may be coupled to the policy/event engine, and that connection may be provided through the communication subsystem 410 and/or via any display device coupling subsystem known in the art.

Figure 5:
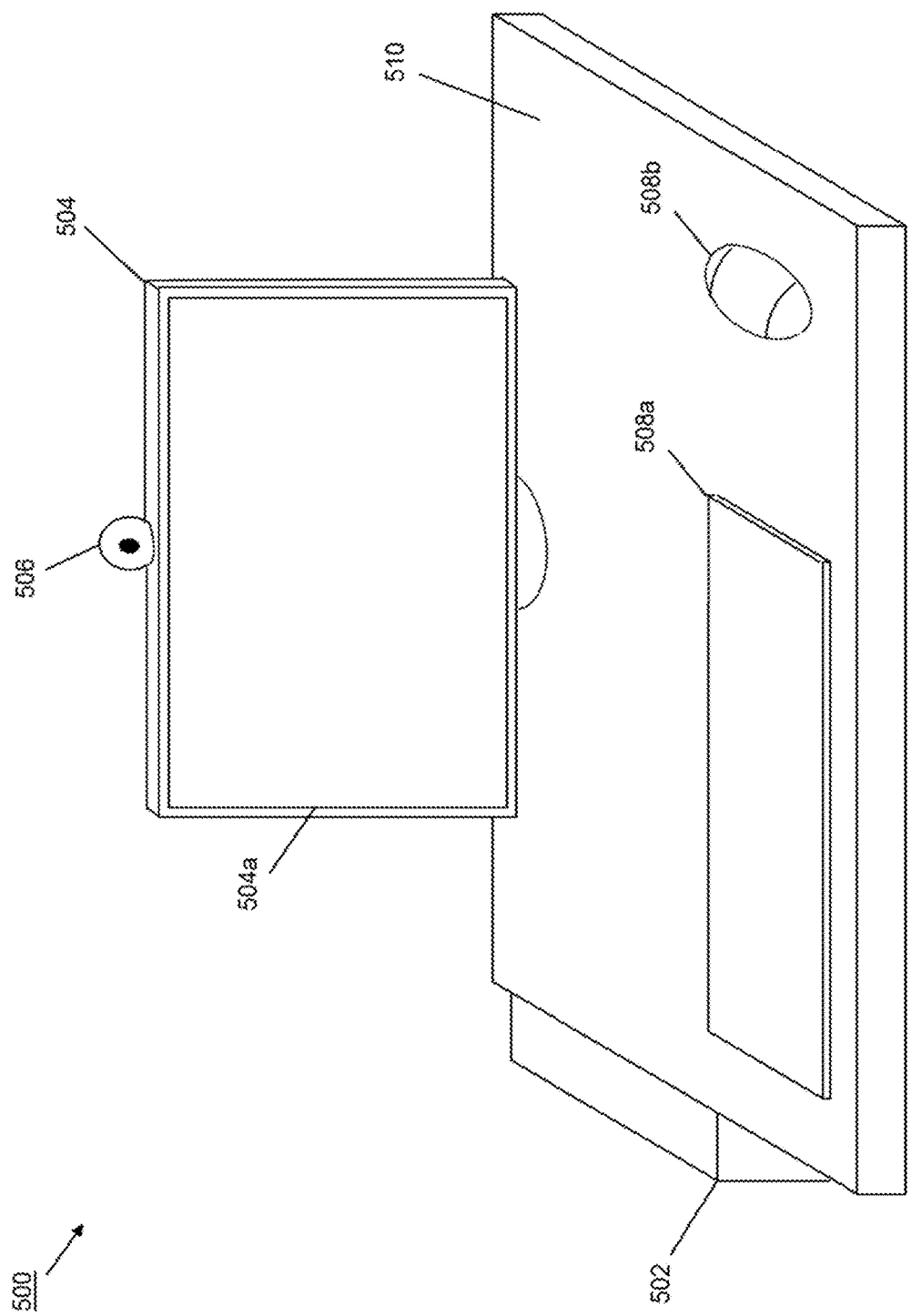
FIG. 5 is a perspective view illustrating an embodiment of the endpoint device of FIG. 4.

Referring now to FIG. 5, an embodiment of an endpoint device 500 is illustrated. In an embodiment, the endpoint device 500 may be any of the endpoint devices 206a-c discussed above with reference to FIG. 2 and/or the endpoint device 400 discussed above with reference to FIG. 4. As such, the endpoint device 500 may be provided by the IHS 100 discussed above with reference to FIG. 1 and/or may include some or all of the components of the IHS 100. In the illustrated embodiment the endpoint device 500 includes a chassis 502 that may be the chassis 402 of FIG. 4 and that houses the components of the endpoint device 500. The endpoint device 500 also includes a display device 504 that may be the display device 414 of FIG. 4 and that may be coupled to the chassis 502 via a display device connector such as the display device connector 412 of FIG. 4, a wireless display device connection, and or other couplings known in the art. The display device 504 includes a display screen 504a that is configured to display information in response to instructions provided by a user and/or a processing system in the chassis 502. In the illustrated embodiment, an image capturing device 506 is provided on the display device 504 and may be coupled to the processing system in chassis 502 directly (e.g., via a cabled connection or wireless connection) or through the display device 504. In different embodiments, the image capturing device 506 may be a still image capturing device, a video capturing devices, an infrared image capturing device, and/or a wide variety of other image capturing devices known in the art. Furthermore, as discussed below, the image capturing device may include or be coupled to subsystems that provide functionality including facial recognition, iris detection, and/or other recognition techniques known in the art. While the image capturing device 506 is illustrated as integrated with and located on the display device 504, the image capturing device 506 may be separate from the display device 504 and positioned in different locations than is illustrated in FIG. 5. The endpoint device 500 also includes a plurality of input devices 508a and 508b (e.g., a keyboard and mouse) that are coupled to the processing system in the chassis 502 (e.g., via a cabled connection or a wireless connection as illustrated). The display device 504, image capturing device 506, and input devices 508a and 508b may be provided on a surface 510 such as a desktop. As discussed above, while the endpoint device 500 is illustrated as a desktop computing system, other types of computing systems (including any of a variety of mobile computing systems) are envisioned as falling within the scope of the present disclosure.

Figure 6:
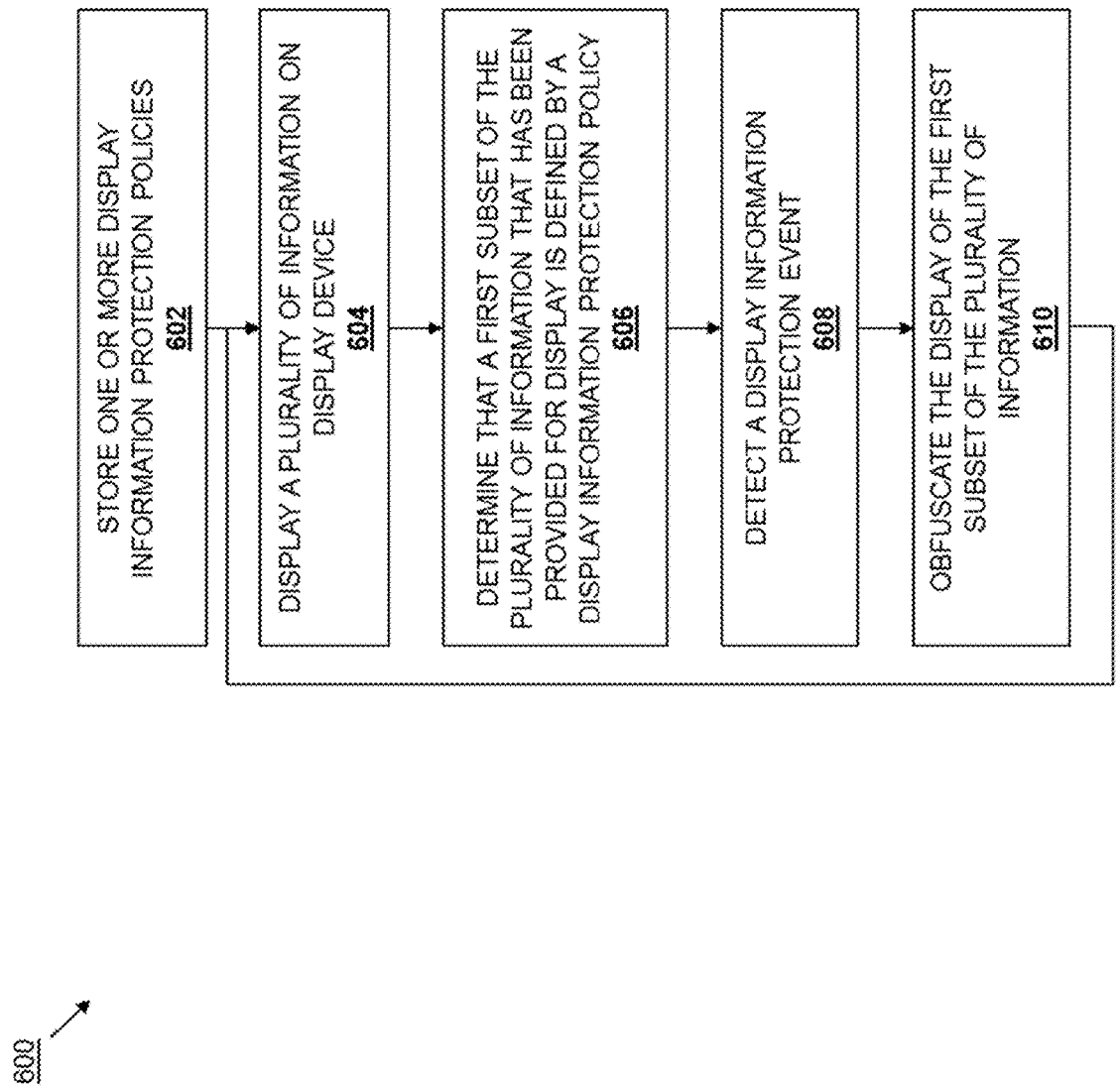
FIG. 6 is a flow chart illustrating an embodiment of a method for providing event-based display information protection.
Figure 7:
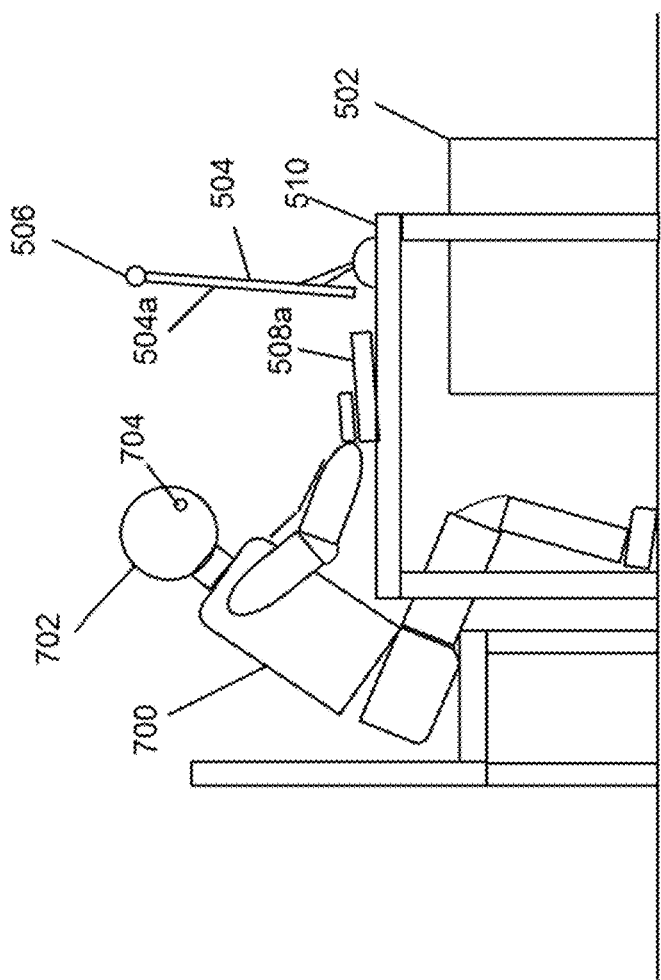
FIG. 7 is a side view illustrating an embodiment of an authorized user using the endpoint device of FIG. 5.

Referring now to FIG. 6, an embodiment of a method 600 for providing event-based display information protection is illustrated. As discussed in further detail below, the method 600 provides for the protection of information being displayed on one or more display devices by monitoring instructions to display information on those display devices, determining one or more subsets of that information that are defined by an display information protection policy, detecting display information protection events and, in response, obfuscating the display of the subsets of information that are defined by the display information protection policy on those display devices. Display information protection events may be defined to detect situations when unauthorized users may have viewing access to the information being displayed on those display devices, and display information policies may be retrieved from a management system, automatically populated, and/or otherwise provided and stored that define sensitive information that will be protected from viewing by those unauthorized users. In addition, some embodiments of the systems and methods of the present disclosure provide for selective obfuscation of sensitive information such that non-sensitive information being displayed on the display device(s) is still viewable by users.

The method 600 begins at block 602 where one or more display information protection policies are stored. In an embodiment, at block 602 the policy/event engine 404b may store display information protection policies in the policy/event database 408a. In some embodiments, display information protection policies may be automatically populated by the policy/event engine 404b and/or other components in the endpoint device 400 and stored in the policy/event database 408a. For example, the policy/event engine 404b may communicate with applications operating on the endpoint device to determine the sensitivity of data or information being utilized with those applications, and in some situations the details that allow for the recognition of that sensitive data (i.e., display information protection policies) may then be automatically populated in the policy/event. In another embodiment, display information protection policies may be provided by the manufacturer of the endpoint device or an event-based display information protection application running on that endpoint device and enabled automatically (e.g., by default) unless modified by a user or administrator. For example, such automatically populated display information policies (i.e., enabled without instructions from the administrator or user) may allow data or information to be classified automatically and in real time to recognize specific patterns (with number generically indicated by the hash (#) marks and letters generically indicated by "x" below) such as, for example:

Social Security Numbers: ###-##-####
Money: $#,###.##
Addresses: #### xxxx drive
Zip Codes: #####-####
Phone Numbers: 1-###-###-####
Names Xxxxx Xxxxx Furthermore, classification levels may also be automatically populated based on the pattern of the information being displayed that is different from the patterns detailed above, and any personally identifiable data (i.e., any data for information that may be used to identify a person) that is recognized using any method known in the art may result in a sensitivity classification being automatically applied to that data or information.

In addition, the display information protection policies may be associated with display information protection events in the policy/event database 408a. As discussed in further detail below, the display information protection events may be defined for any detectable situation in which an unauthorized user may have viewing access to sensitive information on a display screen. Furthermore, display information protection actions may be defined for sensitive information and stored in the protection action database 408b. As discussed in further detail below, display information protection actions may be based on the sensitivity of the information that is to be displayed, the detected display information protection event, and/or any other factor associated with the protection of the information that is to be displayed. Thus, display information protection policies, display information detection events, and/or display information protection actions may be automatically determined by the endpoint device 500, continuously refined, and stored in the policy/event database 408a at block 602.

In some embodiments, display information protection policies may be created on the management system 202/300 (e.g., by an administrator) and stored in the policy/event database 306a using the management engine 304. As discussed above, the endpoint device database 306b in the management system 300 may include identifying information about the endpoint devices 206a-c in the display information protection system 200, users of the endpoint devices 206a-c in the display information protection system 200, and/or other information about the endpoint devices 206a-c in the display information protection system 200 that allows the management system 202 to push the display information protection polices to the endpoint devices 206a-c in the display information protection system 200 based on information accessible through those endpoint devices 206a-c, users authorized to use those endpoint devices 206a-c, and/or any other criteria that is associated with information that may be displayed on the endpoint devices 206a-c. Similarly as discussed above, the display information protection policies may be associated with display information protection events in the policy/event database 306a, and the display information protection events may be defined for any detectable situation in which an unauthorized user may have viewing access to sensitive information on a display screen. Also similarly as discussed above, display information protection actions may be defined for sensitive information and stored in the protection action database 306c, and the display information protection actions may be based on the sensitivity of the information that is to be displayed, the detected display information protection event, and/or any other factor associated with the protection of the information that is to be displayed. Thus, at block 602, the management engine 308 may be used to define and provide display information protection policies, display information protection events, and/or display information protection actions through the communication subsystem 308 and over the network 204 such that they are received by the policy/event engine 404b through the communication subsystem 410 and stored in the policy/event database 408a and/or the protection action database 408b.

While a few examples of the storage of the display information protection policies (and in some embodiments, other information such as display information protection events and display information protection actions) at block 602 have been provided, one of skill in the art in possession of the present disclosure will recognize that the policies, events, and actions discussed above and described below may be provided in any of a variety of manners while remaining within the scope of the present disclosure. For example, users of endpoint devices 206a-c may define policies, events, and/or actions utilized by the display information protection system. Furthermore, endpoint devices 206a-c may share policies, events, and/or actions between each other. Further still, applications provided on the endpoint devices 206a-c may define the policies, events, and/or actions, and may cause those policies, events, and/or actions to be shared between each other in an endpoint device or across endpoint devices. Thus, the provision and/or storage of the policies, events, and/or actions in the endpoint devices 206a-c is envisioned as being performed in any of a variety of manners while remaining within the scope of the present disclosure.

The method 600 then proceeds to block 604 where a plurality of information is displayed on a display device. Referring now to FIGS. 7, 8, 9, and 10, embodiments of the display of information at block 604 are provided. While those embodiments are directed to the use of a desktop computing system (e.g., the endpoint device 500 illustrated in FIG. 5), as discussed above the method 600 and display information protection system 200 may be provided on any of a variety of computing devices including laptop/notebook computers, tablet computers, mobile phones, and/or any other computing devices known in the art. In the embodiment in FIG. 7, a primary or authorized user 700 (with the head 702 and the eyes 704 of the authorized user 700 illustrated) is illustrated using the endpoint device 500 of FIG. 5 to provide instructions to the processing system located in the chassis 502 using the input device 508a to cause information to be displayed on the display screen 504a of the display device 504. With reference to FIG. 4, at block 604 the display engine 406 in the endpoint device 400 receives the instructions from the user 700 and collects, processes, and/or otherwise provides the plurality of information for display through the display device connector 412 to the display device 414. In the embodiments discussed below, the authorized user 700 is authorized to view all of the information being displayed on the display screen 504a of the display device 504 throughout the method 600. However, in other embodiments the authorized user 700 may be an authorized user for some information displayed on the display screen 504a of the display device 504 and an unauthorized user for other information displayed on the display screen 504a of the display device 504 (e.g., as described below with regard to the secondary or unauthorized user 1200 illustrated in FIG. 12.)

Figure 8:
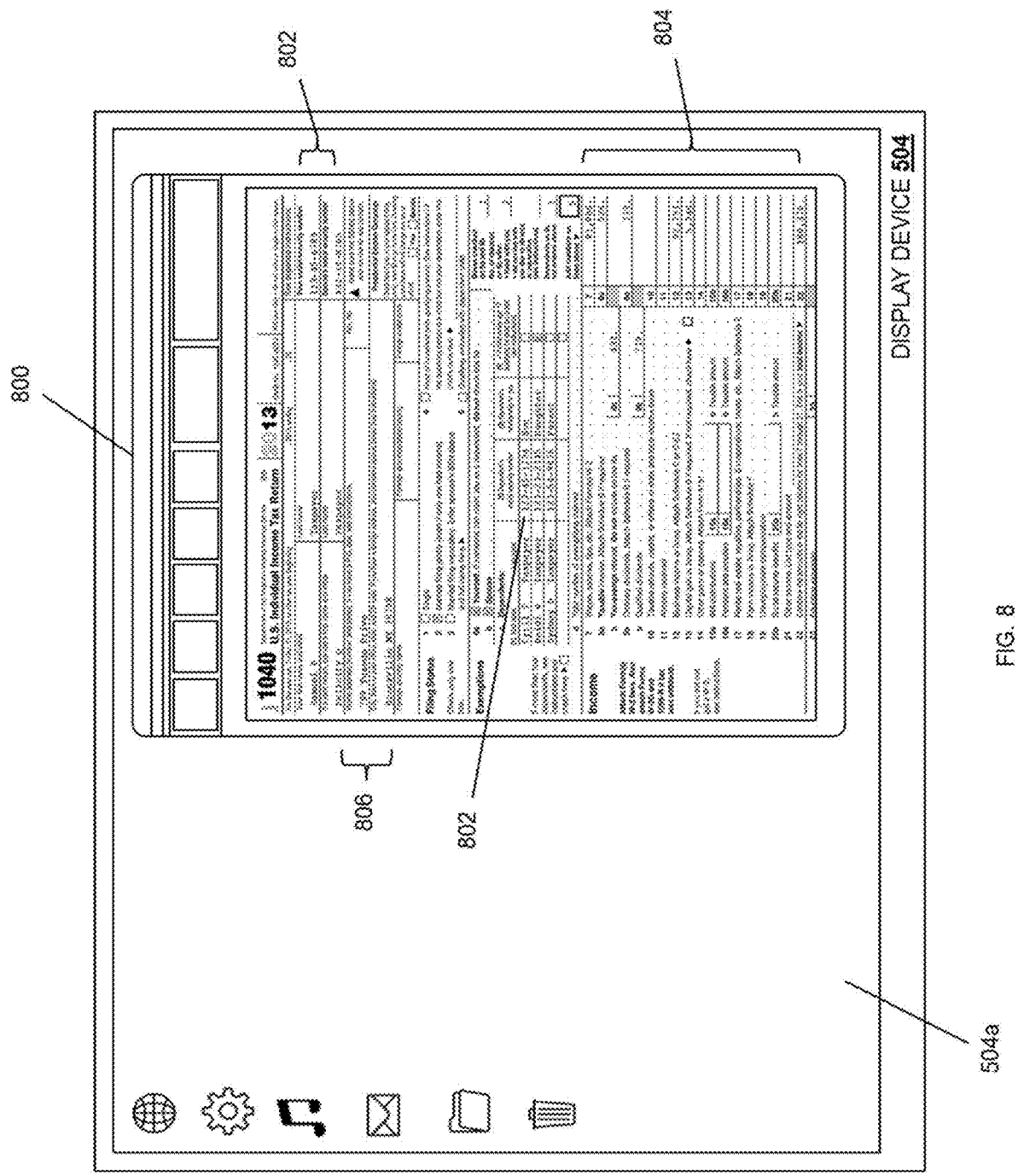
FIG. 8 is a screen shot illustrating an embodiment of a display screen on the endpoint device of FIG. 7 displaying sensitive information.

Referring now to FIG. 8, an embodiment of a plurality of information being displayed on the display device at block 604 is illustrated. In the illustrated embodiment, the display device 504 being used by the user 700 is displaying the plurality of information on the display screen 504a via an application graphical user interface (GUI) 800 that provides the plurality of information on the display screen 504a using methods known in the art. For example, in FIG. 8 the application GUI 800 is displaying a tax information form that may be provided via a portable document format (PDF) document displayed on the display screen 504a through the PDF viewer/application GUI 800. However, one of skill in the art in possession of the present disclosure will recognize that any of a variety of applications may display information in any of a variety of manners at block 604 while remaining within the scope of the present disclosure. In the specific example in FIG. 8, the plurality of information displayed via the application GUI 800 includes subsets 802, 804, and 806 of the displayed information that may have differing levels of sensitivity. For example, the subset 802 of the displayed information may be a relatively high sensitivity due to that information including social security numbers, while the subset 804 of the displayed information may be a relatively medium sensitivity due to that information including financial information, and the subset 806 of the displayed information may be a relatively low sensitivity due to that information including a home address. In addition, other information (e.g., names, classification information, etc.) may not be considered sensitive information relative to the subsets 802, 804, and 806 of the displayed information.

Figure 9:
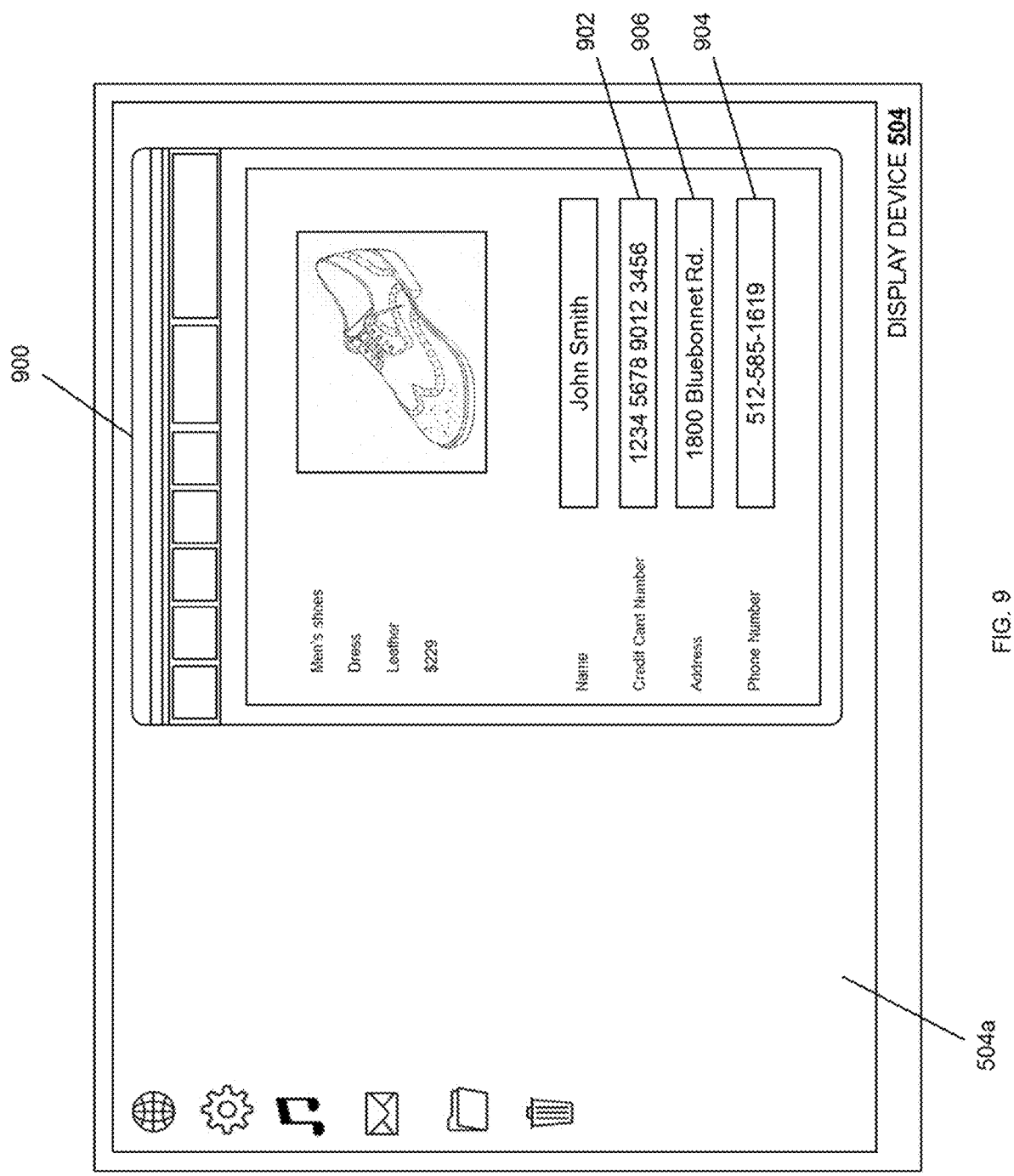
FIG. 9 is a screen shot illustrating an embodiment of a display screen on the endpoint device of FIG. 7 displaying sensitive information.

Referring now to FIG. 9, another embodiment of a plurality of information being displayed on the display device at block 604 is illustrated. In the illustrated embodiment, the display device 504 being used by the user 700 is displaying the plurality of information on the display screen 504 via an application graphical user interface (GUI) 900 that provides the plurality of information on the display screen 504a using methods known in the art. For example, in FIG. 9 the application GUI 900 is displaying a product purchasing information form that may be provided via a web page displayed on the display screen 504a through the web browser/application GUI 900. However, one of skill in the art in possession of the present disclosure will recognize that any of a variety of applications may display information in any of a variety of manners at block 604 while remaining within the scope of the present disclosure. In the specific example in FIG. 9, the plurality of information displayed via the application GUI 900 includes subsets 902, 904, and 906 of the displayed information that may have differing levels of sensitivity. For example, the subset 902 of the displayed information may be a relatively high sensitivity due to that information including a credit card number, while the subset 904 of the displayed information may be a relatively medium sensitivity due to that information including a phone number, and the subset 806 of the displayed information may be a relatively low sensitivity due to that information including a home address. In addition, other information (e.g., names, product information, etc.) may not be considered sensitive information relative to the subsets 902, 904, and 906 of the displayed information.

Figure 10:
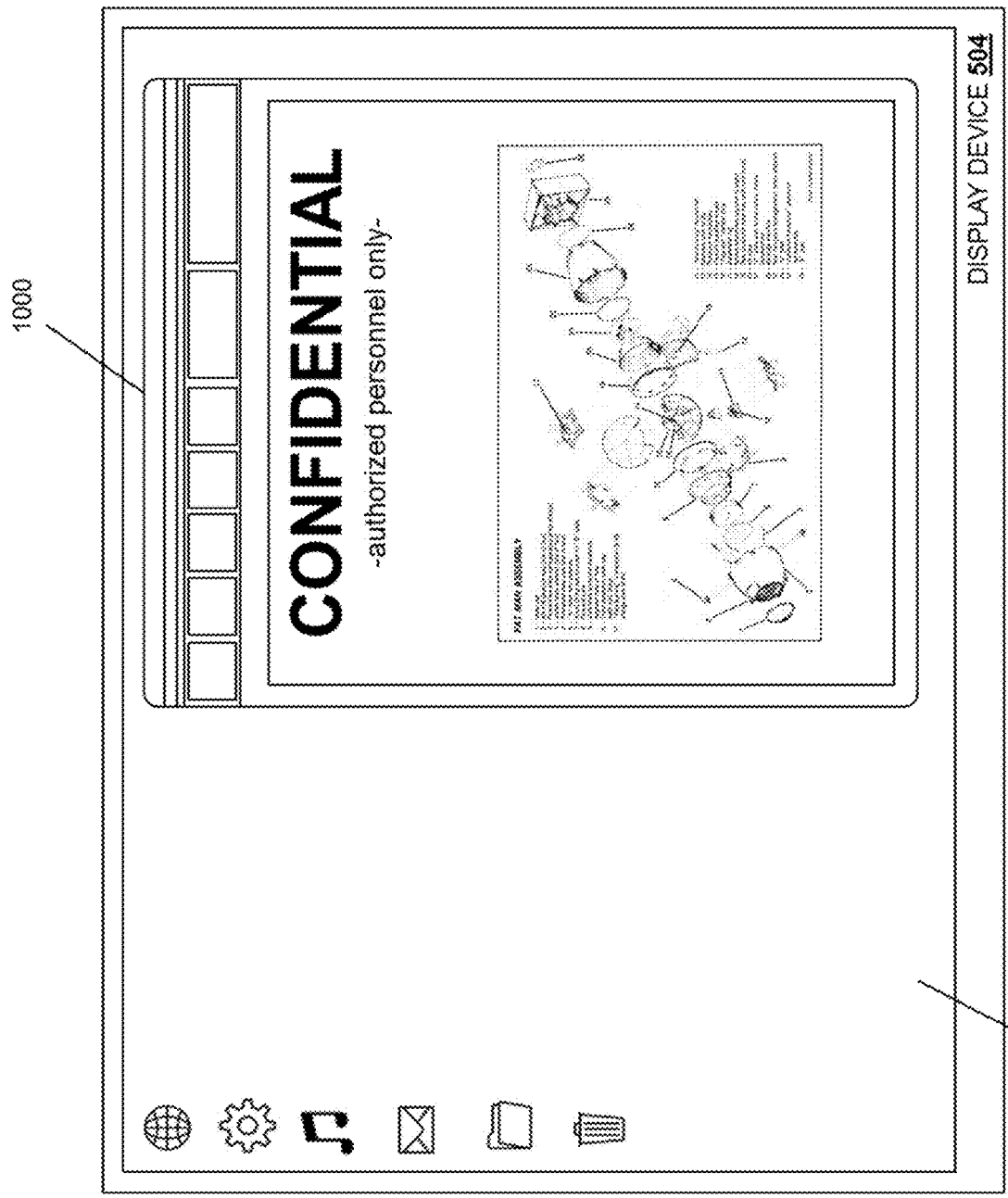
FIG. 10 is a screen shot illustrating an embodiment of a display screen on the endpoint device of FIG. 7 displaying sensitive information.

Referring now to FIG. 10, another embodiment of a plurality of information being displayed on the display device at block 604 is illustrated. In the illustrated embodiment, the display device 504 being used by the user 700 is displaying the plurality of information on the display screen 504 via an application graphical user interface (GUI) 1000 that provides the plurality of information on the display screen 504a using methods known in the art. For example, in FIG. 10 the application GUI 1000 is displaying a product design that may be provided via a document displayed on the display screen 504a through the document editor/application GUI 1000 (e.g., a word processing application, a presentation application, etc.). However, one of skill in the art in possession of the present disclosure will recognize that any of a variety of applications may display information in any of a variety of manners at block 604 while remaining within the scope of the present disclosure. In the specific example, in FIG. 10, the plurality of information displayed via the application GUI 1000 is highly sensitive in that the entire document is categorized as viewable only by authorized users.

While a few specific examples of information displayed at block 604 of the method 600 have been illustrated and described, one of skill in the art in possession of the present disclosure will recognize that the display information protection system and method taught herein may be applied to almost any information that may be displayed on a display screen. For example, while the embodiments provided herein focus on social security information, financial information, payment information, and confidential corporate information, a user or users may define any of a variety of other information as sensitive information that may be protected using the teachings provided herein. As such, the systems and methods of the present disclosure, while applicable to the security of sensitive information, may also be considered as enabling information privacy for users that wish to keep any or all of the information displayed on their display screens private. Thus, the "sensitivity" of the information protected using the systems and methods of the present disclosure may depend on the user implementing those systems and methods, and may include information that, while not confidential or access-restricted in many scenarios, will be protected according to the teachings provided herein based on events and actions defined by the user of that information.

The method 600 then proceeds to block 606 where it is determined that a first subset of the plurality of information that has been provided for display is defined by a display information protection policy. As discussed above with regard to block 604, in response to instructions from the user 700, the display engine 406 may retrieve, generate, and/or otherwise provide the plurality of information for display on the display screen 504a of the display device 504 (i.e., via the display device connector 412). However as discussed with regard to blocks 606 and 608 of the method 600, when information is provided for display on the display screen 504a of the display device 504, the display information protection system may determine whether any of that information is defined by a display information protection policy and, if so, whether a display information protection event is occurring. As discussed below with regard to block 610 of the method 600, if information is defined by a display information protection policy and a display information protection event is occurring, that information is obfuscated to protect that information from being viewed by unauthorized users. As such, in the specific example of the information displayed in FIGS. 8, 9, and 10, that information either was not defined by a display information protection policy (i.e., none of that information had been defined as sensitive information), or else there was no display information protection event occurring (e.g., because the authorized user 700 is authorized to view all of that information).

With reference to FIG. 4, at block 606 the display engine 406 sends the information (as retrieved, generated, and/or otherwise provided by the display engine 406 in response to the instructions from the user 700) that has been provided for display on the display device 414 to the data valuation engine 404a. As discussed above, the data valuation engine 404a may be configured to parse the information that has been provided for display on the display device 414 and determine the value of that information. For example, the data valuation engine 404a may be configured to parse text that has been provided for display on the display device to classify that text, recognize text strings, and/or perform any other text classification, recognition, and/or other functions known in the art. In a specific example, the data valuation engine 404a may be configured to recognize the format of text strings such as social security numbers, credit card numbers, phone numbers, bank account numbers, and/or any other sensitive financial information known in the art. The data valuation engine 404a may also be configured to recognize any alphanumeric and/or other character string as well.

Similarly, the data valuation engine 404a may be configured to parse images that have been provided for display on the display device to classify those images, recognize elements in those images, and/or perform any other image classification, recognition, and/or other functions known in the art. In a specific example, the data valuation engine 404a may be configured to recognize particular people in images (e.g., via face recognition), particular elements in images (e.g., drug paraphernalia), and/or any other definable image element. Similarly, the data valuation engine 404a may be configured to parse files that have been provided for display on the display device to classify those files, recognize metadata provided with those files, and/or perform any other file classification, recognition, and/or other functions known in the art. In a specific example, the data valuation engine 404a may be configured to recognize particular files (e.g., video files with adult content). Similarly, the data valuation engine 404a may be configured to parse applications that have been provided for display on the display device to classify those applications, recognize features provided with those applications, and/or perform any other file classification, recognition, and/or other functions known in the art. In a specific example, the data valuation engine 404a may be configured to recognize particular applications (e.g., gaming application with adult content) or application functions (e.g., a web browser directed to a website with adult content). While a few information formats (i.e., text, images, files, and applications) have been described as being processed by the data valuation engine 404a, any of a variety of other information may be processed by the data valuation engine 404a to enable the functionality discussed below. In some embodiments, the data valuation engine 404a may be configured to provide a classification of the information that has been provided for display on the display device 414. For example, information may be recognized and classified as highly sensitive, of medium sensitivity, of low sensitivity, of highly private, having medium privacy, of having low privacy, and/or using other classifications known in the art. In other examples, classifications may include more granularity than simply high, medium, and low, and in some embodiments the recognized information may simply be provided to the policy/event engine 404b for analysis and/or comparison to policies as discussed below.

The data valuation engine 404a then provides the results of the processing of the information that has been provided for display on the display device 414 to the policy/event engine 404b. In an embodiment, the data valuation engine 404a may provide the policy/event engine 404b text that has been recognized and classified, text strings that have been recognized and classified, images that have been recognized and classified, image elements that have been recognized and classified, files that have been recognized and classified, applications that have been recognized and classified, and/or any other information processed as discussed above to the policy/event engine 404b. At block 606, the policy/event engine 404b compares the information recognized and/or classified by the data valuation engine 404a to the display information protection policies in the policy/event database 408a to determine whether that information is defined by a display information protection policy. For example, with reference to the information provided for display in the application GUI 800 of FIG. 8, the policy/event engine 404b may compare the information provided for display by the application GUI 800 to the display information protection policies in the policy/event database 408a and determine that the subsets 802, 804, and 806 of the information are defined by one or more display information protection policies. Similarly, with reference to the information provided for display in the application GUI 900 of FIG. 9, the policy/event engine 404b may compare the information provided for display by the application GUI 900 to the display information protection policies in the policy/event database 408a and determine that the subset 902 of information is defined by a display information protection policy. Also similarly, with reference to the information provided for display in the application GUI 1000 of FIG. 10, the policy/event engine 404b may compare the information provided for display by the application GUI 1000 to the display information protection policies in the policy/event database 408a and determine that all of that information is defined by one or more display information protection policies (i.e., the subset of the information defined by the display information protection policy encompasses all of that information).

Figure 11:
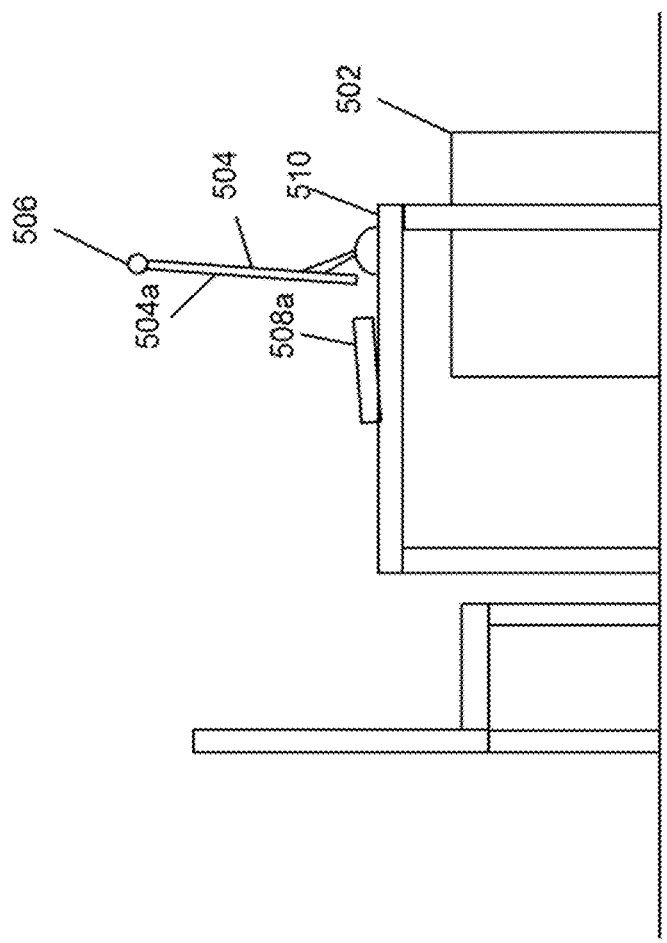
FIG. 11 is a side view illustrating an embodiment the endpoint device of FIG. 7 with the authorized user no longer located in front of the display screen.

The method 600 then proceeds to block 608 where a display information event is detected. As discussed above, in the examples provided, the authorized user 700 is authorized to view any of the information provided for display on the display device as illustrated in FIGS. 7, 7, 8, 9, and 10, and thus those embodiments illustrate either that the information being provided for display was not defined by a display information protection policy, or that the determination was made that no display information protection event was occurring. However, referring now to FIGS. 11 and 12, embodiments of the detection of a display information protection event are provided. Referring first to FIG. 11, the endpoint system 500 is illustrated with the authorized user 700 not located in front of the display screen 504a. In an embodiment, the authorized user 700 may have left the endpoint device 500 relatively temporarily (e.g., for a bathroom break), for a relatively short time (e.g., for a lunch break), or for a relatively extended time (e.g., to go home for the night). In response, the policy/event engine 404b may detect a display information protection event.

For example, a display information protection event may be detected by the policy/event engine 404b in response to a timing event such as a predetermined amount of time passing without an input or instruction being provided by the authorized user 700 using the input devices 508a and 508b (and in some cases in response to the associated display device or system performing a lock action, a sleep action, or other power saving action known in the art). In another example, a display information protection event may be detected by the policy/event engine 404b in response to receiving an image from the image capturing device 506 that doesn't include the authorized user 700. In such an example, the authorized user 700 may have been authorized to use the endpoint device 500 in response to that authorized user 700 being recognized in an image captured by the image capturing device 506. For example, the policy/event engine 404b and/or other subsystems in the endpoint device 500 may be configured to process the image(s) received from the image capturing device 506 to recognize the face, eyes, and/or other features of the authorized user 700 (e.g., using image recognition techniques) and compare the recognized face, eyes, and/or other features to those of authorized users to detect the authorized user 700. However, regardless of the method of authorization, the lack of the authorized user 700 in an image captured by the image capturing device may be defined as a display information protection event. While a few examples of display information protection events determined in response to the user 700 leaving the endpoint device 500 (i.e., such that the user is no longer providing inputs to the endpoint device 500 or is not located in front of the display device 504) have been provided, one of skill in the art in possession of the present disclosure will recognize that any of a variety of display information detection events may be defined and detected in response to a user leaving an endpoint device while remaining within the scope of the present disclosure.

Figure 12:
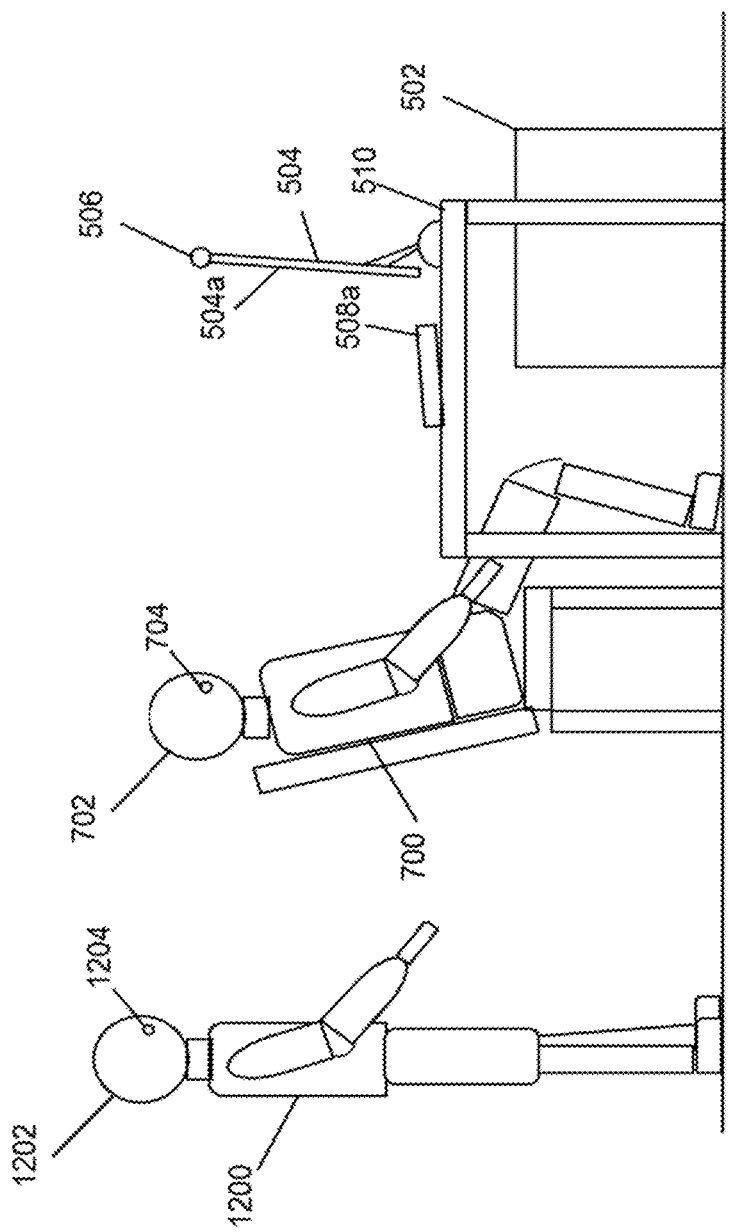
FIG. 12 is a side view illustrating an embodiment the endpoint device of FIG. 7 with an unauthorized user located behind the authorized user.

Referring next to FIG. 12, the endpoint system 500 is illustrated with the authorized user 700 located in front of the display screen 504*a*, and an unauthorized user 1200 (including a head 1202 and eyes 1204) positioned behind the authorized user 700. In an embodiment, the unauthorized user 1200 may have walked up behind the authorized user 700 with or without the knowledge of the authorized user 700. In response, the policy/event engine 404*b* may detect a display information protection event. For example, a display information protection event may be detected by the policy/event engine 404*b* in response to receiving an image from the image capturing device 506 that includes the unauthorized user 1200, and the inclusion of the unauthorized user 1200 in an image captured by the image capturing device may be defined as a display information protection event. In some embodiments, the policy/event engine 404*b* and/or other subsystems in the endpoint device 500 may be configured to process the image(s) received from the image capturing device 506 as discussed above to recognize the features of the unauthorized user 1200 (e.g., using image recognition techniques) and compare those recognized features to the features of authorized users to detect the unauthorized user 1200. In some embodiments, the policy/event engine 404*b* and/or other subsystems in the endpoint device 500 may be configured to process the image(s) received from the image capturing device 506 to detect the eyes of users (e.g., the eyes 704 and 1204 of the users 700 and 1200, respectively) and to determine whether those users are actually looking at the display screen 504*a*. As such, in some embodiments, the display information protection event may be defined as a detected unauthorized user that has been detected looking at the display screen 504*a*.

In addition to those illustrated, a wide variety of other display information protection events are envisioned as falling within the scope of the present disclosure. In an embodiment, as detailed below with reference to FIG. 16, a display information protection event may include the authorized user providing an instruction to "share" the information being provided on their display screen 504*a* of their display device 504. For example, the authorized user 700 may "share" the information provided for display on their display screen 504*a* in order to provide a presentation, receive technical support, and/or in a variety of different scenarios known in the art. In response, the endpoint device 500 may send the information that is being provided for display on the display screen 504*a* of the display device 504 over a network to another computing device for display on its associated display device. In addition, the display of information on any secondary display device coupled to the endpoint device (not necessarily over a network) may provide a display information protection event and resulting display information protection action similarly as described below with reference to FIG. 16. In another embodiment, a display information protection event may include a determined level of authentication. For example, a display information protection event may be detected when a user has authenticated to the endpoint device at a level that is lower than information that is being provided for display on that endpoint device. In another embodiment, a display information protection event may include a detected user change (e.g., from the authorized user 700 to the unauthorized user 1200 via the image recognition techniques discussed above, based on authentication credentials received, etc.)

In another embodiment, a display information protection event may include an ambient light change. For example, the policy/event engine 408*b* may be coupled to an ambient light sensor that can report changes in ambient light that may be detected when the endpoint device is moved. In another embodiment, a display information protection event may include the detection of a connection of a display device to the endpoint device. For example, the authorized user 700 may connect a projector or other secondary display device to the endpoint device 500 to provide a presentation, and that connection may result in the information being displayed on the endpoint device 500 being projected into the view of unauthorized users. In another embodiment, a display information protection event may include the detection of a network change. For example, the authorized user 700 may move the endpoint device 500 such that it disconnects from a currently connected network and connects to a new network. In another embodiment, a display information protection event may include the authorized user logging into the endpoint device 500 after being logged out. For example, the authorized user 700 may be logged out from the endpoint device 500 after a period of inactivity while that endpoint device 500 was displaying sensitive information, and then may log back into that endpoint device 500 when the unauthorized user 1200 is able to view the display screen 504*a* of the display device 504. While several examples of display information protection events have been provided, one of skill in the art in possession of the present disclosure will recognize that any event, situation, or scenario that may result in an unauthorized user being able to view information on the display screen of a display device may be defined as a display information protection event while remaining within the scope of the present disclosure.

The method 600 then proceeds to block 610 where the display of the first subset of the plurality of information is obfuscated. In an embodiment, in response to determining that the subset of the plurality of information that has been provided for display on the display screen 504*a* of the display device 504 is defined by a display information protection policy at block 606, and detecting the display information protection event at block 608, the policy/event engine 404*b* may access the protection action database 408*b* to retrieve a display information protection action and apply that display information protection action to the subset of information that has been provided for display, followed by the provision of the plurality of information through the display device connector 412 to the display device 414 for display. However, the application of the display information protection action to the subset of information that has been provided for display will result in the plurality of information being displayed on the display screen 504*a* of the display device 504 with the subset of the information being obfuscated such that it cannot be viewed (or clearly viewed) by any users. While a variety of different display information protection actions are illustrated and described below, in some embodiments, the policy/event engine 404*b* may perform the same display information protection action on any information that is defined by a display information protection policy when a display information protection event is protected. However, the discussion below details how, in some embodiments, different levels of obfuscation of sensitive information may be performed depending on the sensitivity of that information (e.g., as determined by the display information protection engine 404), the level of authorization of unauthorized users, and/or any other factors that may be relevant to the viewing of that sensitive information.

Figure 13:
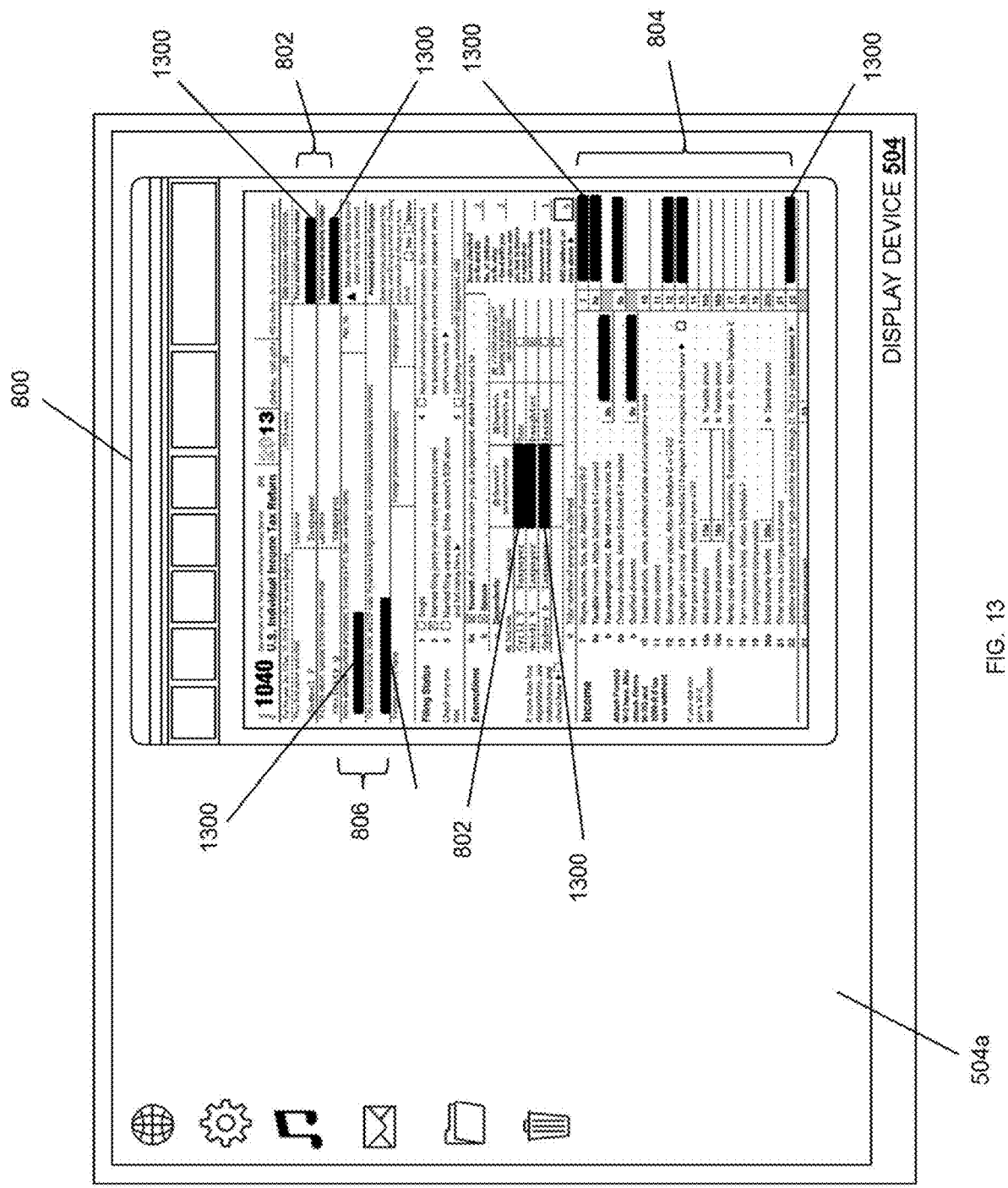
FIG. 13 is a screen shot illustrating an embodiment of a display screen on the endpoint device of FIG. 7 performing a protection action on sensitive information that was being displayed on the display screen.

Referring now to FIG. 13, and with reference to FIG. 8, in response to detecting a display information protection event the policy/event engine 404b has provided the application GUI 800 displaying the plurality of information, but with graphical elements 1300 provided that obfuscate the subsets 802, 804, and 806 of information that are defined by the display information protection policy. In the illustrated example, the graphical elements 1300 provide for the "redaction" of the subsets 802, 804, and 806 of information being displayed using the application GUI 800. However, in other embodiments, the subsets 802, 804, and 806 may be removed from the information being displayed using the application GUI 800. In some embodiments, the graphical elements 1300 may be provided as graphical elements that are separate from the application GUI 800 and/or any file associated with the information being displayed using the application GUI 800. However, in other embodiments, the graphical elements 1300 may be provided by the application GUI 800 (as instructed by the policy/event engine 404b) in place of the subsets 802, 804, and 806 of the information.

Figure 14:
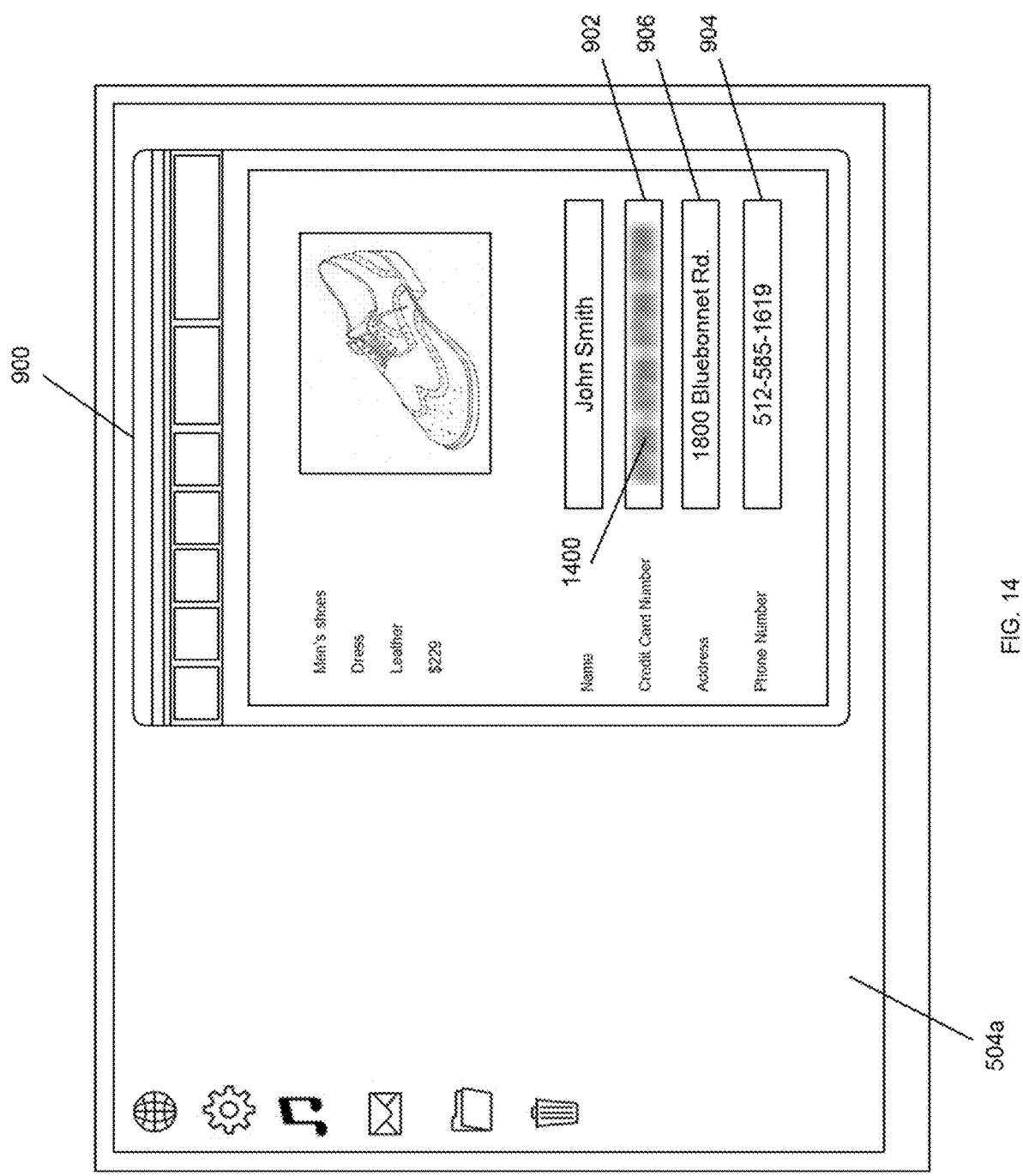
FIG. 14 is a screen shot illustrating an embodiment of a display screen on the endpoint device of FIG. 7 performing a protection action on sensitive information that was being displayed on the display screen.

Referring now to FIG. 14, and with reference to FIG. 9, in response to detecting a display information protection event the policy/event engine 404b has provided the application GUI 900 displaying the plurality of information but with the subset 902 of information that is defined by the display information protection policy modified such that it is obfuscated. In the illustrated example, the subset 902 of information has been modified by "blurring" that subset of information such that it cannot be viewed and recognized (i.e., such that the credit card number it includes cannot be read). In some embodiments, the modification of the subset 902 of information may be modified separately from the application GUI 900 and/or any file associated with the information being displayed using the application GUI 900 by, for example, providing a virtual filter over the subset 902 of information being displayed by the application GUI 900. However, in other embodiments, the subset of information 902 may be modified and provided by the application GUI 800 (as instructed by the policy/event engine 404b) in place of the subset 902 of information. FIG. 14 illustrates how some information may be sensitive (i.e., the address and phone number in the subsets 906 and 904 of information) but may not be obfuscated based on, for example, a determination that such information is not sensitive, the information not being defined by a display information protection policy, a user being detected that is authorized to view that information (but not the credit card information in the subset 902 of information), and/or any of a variety of other factors.

Figure 15B:
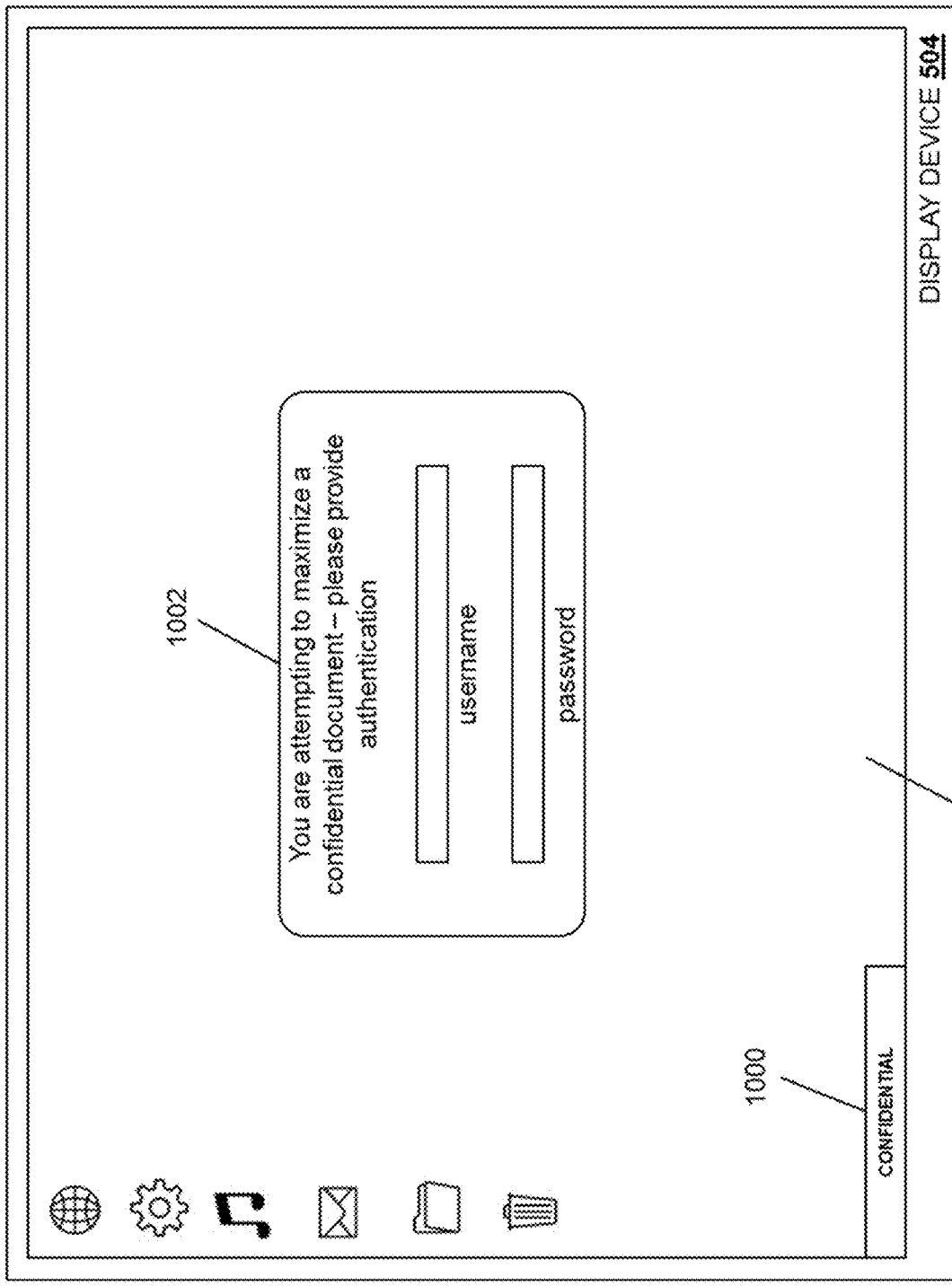
FIG. 15B is a screen shot illustrating an embodiment of a display screen on the endpoint device of FIG. 15A requiring authentication to view the sensitive information after the performance of the protection action.

Referring now to FIGS. 15A and 15B, and with reference to FIG. 10, in response to detecting a display information protection event the policy/event engine 404b has "minimized" the application GUI 1000 displaying the plurality of information that is defined by the display information protection policy such that it is obfuscated (i.e., not visible on the display screen 504a). In the illustrated example, the application GUI 1000 has been modified such that it is present on the display screen 504a (in the lower left corner as illustrated), but with the information that was being displayed prior to the detection of the display information protection event no longer visible. FIG. 15B illustrates how a user may select the application GUI 1000 to, for example, "maximize" the application GUI 1000 or otherwise make the information displayed through the application GUI 1000 visible, and the policy/event engine 404b may provide an authentication request 1002 that requires the user that is attempting to view the information available through the application GUI 1000 to provide credentials that will allow them to do so.

Figure 16:
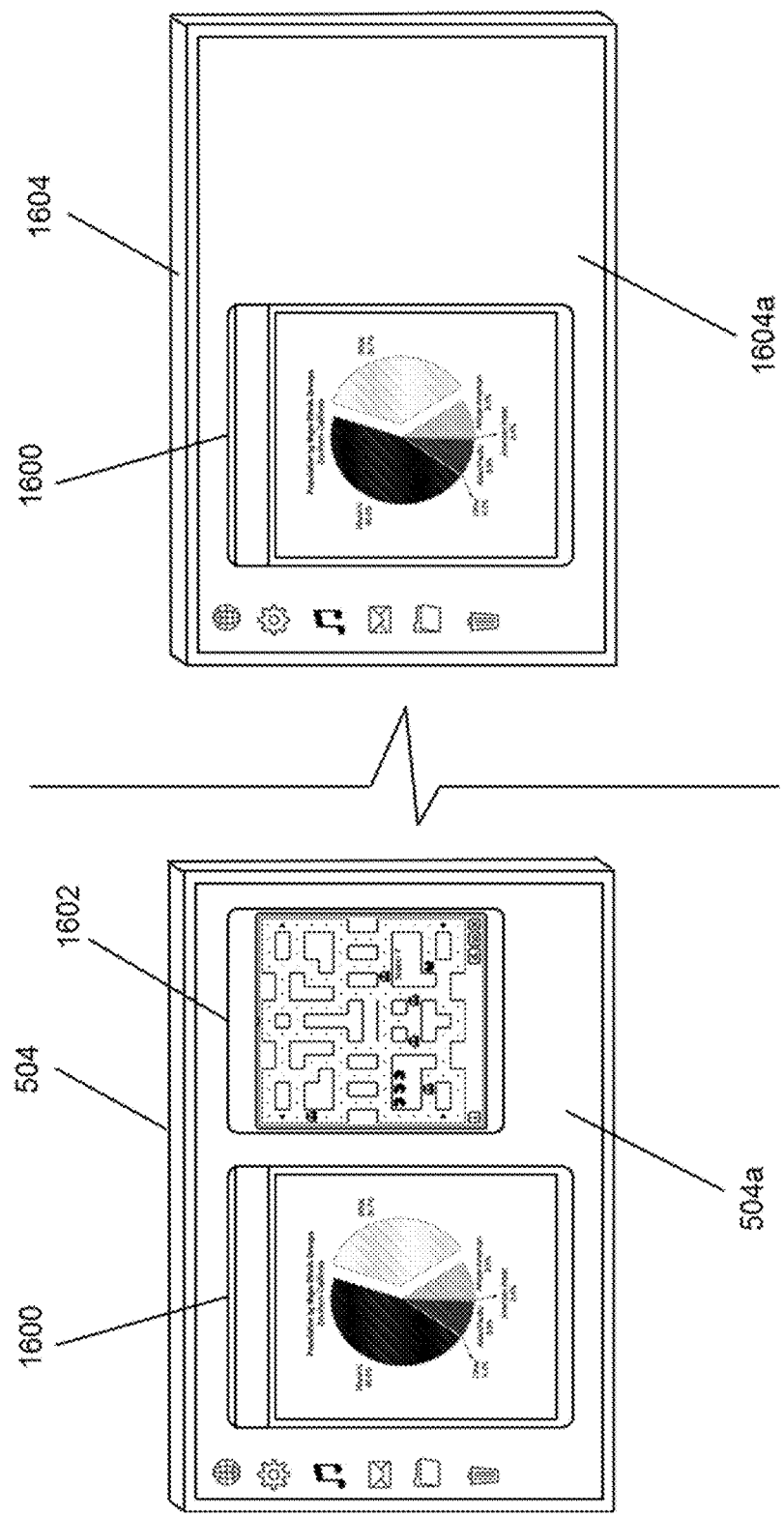
FIG. 16 is a screen shot illustrating an embodiment of a display screen on the endpoint device of an authorized user that is being shared with an unauthorized user while displaying sensitive information, as well as a display screen on the endpoint device of the unauthorized user following a protection action by the endpoint device of the authorized user.

Referring now to FIG. 16, in response to detecting a display information protection event, the policy/event engine 404b has modified a "screen share" such that information that has been provided for display on a display device is not transmitted over a network for display on another display device. For example, the authorized user 700 may be using the endpoint device 500 to display both of a presentation application GUI 1600 and a gaming application GUI 1602. In addition that authorized user 700 may provide a display screen share instruction on the endpoint device 500 to transmit the information being provided on the display screen 504a of the display device 504 over a network for display on a display screen 1604a of a display device 1604 (e.g., the display device connected to the communication subsystem 410 in FIG. 4 as discussed above). According to the method 600 above, the policy/event engine 404b may determine that the gaming application GUI 1602 is defined by a display information protection policy and that an associated display information protection event has been detected (i.e., the authorized user may have defined policies and events that prevent the display of gaming applications on a shared screen when a display screen share instruction is provided) and, in response, the policy/event engine 404b has transmitted the presentation application GUI 1600 over the network such that is it displayed on the display screen 1604a of the display device 1600, while the gaming application GUI 1602 has been obfuscated such that it is not visible at all on the display screen 1604a of the display device 1600.

While several examples of display information protection actions have been illustrated and described above, one of skill in the art in possession of the present disclosure will recognize that any of a variety of display information protection actions may be performed to prevent an unauthorized user from viewing information that is provided for display on the display screen of a display device. For example, display information protection actions may include terminating a process or application displaying the sensitive information, providing a display window over the display of the sensitive information, launching an application such that the application displaying the sensitive information is obscured, "cleaning" the desktop provided on the display screen, etc. In one specific embodiment, a display information protection action may include launching a secondary virtual desktop in place of the desktop provided on the display screen that includes the sensitive information that is being displayed (i.e., launching a virtual desktop that doesn't include the application displaying the sensitive information). Thus, any of a wide variety of obfuscation techniques may be applied to sensitive information, just a few of which are illustrated and described above, that will fall within the scope of the present disclosure.

Thus, systems and methods have been described that protect against the viewing of sensitive information by unauthorized users by obfuscating the display of that sensitive information according to policies and detected events. Such systems and methods address the security of data that may have been accessed by an authorized user and then subsequently be comprised by an unauthorized user that is within view of the display screen upon which it is being displayed. The systems and methods allow for the automatic generation and/or distribution of policies that define what viewing access users should have to sensitive information, and then monitor for events when that sensitive information is being displayed to determine when to obfuscate the display of that data to ensure that it is not compromised. In some embodiments, further security functions may be performed by the endpoint device upon which sensitivity information has been obfuscated if detected events indicate that the information may be compromised, including erasing that information from the endpoint device (e.g., wiping a storage system, clearing a browser history, etc.), shutting down the endpoint device, requiring re-authentication to use the endpoint device, and/or other security actions.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A display information security system, comprising:
   a server device that is coupled to a network and that stores a plurality of display information protection policies, wherein the server device is configured to provide any of the display information protection policies through the network; and
   a computing device that is coupled to the server device through the network, wherein the computing device is configured to:
      receive, from the server device through the network, a first display information protection policy of the plurality of display information protection policies;
      store the first display information protection policy;
      provide an application that includes a plurality of information for display;
      determine that a first subset of the plurality of information included in the application that has been provided for display is defined by the first display information protection policy;
      detect a first display information protection event, wherein the detecting the first display information protection event includes determining that an amount of time has passed without an input being provided to the computing device; and
      obfuscate, in response to determining that the first subset of a plurality of information is defined by the first display information protection policy and detecting the first display information protection event that includes the determination that the amount of time has passed without an input being provided to the computing device, the first subset of the plurality of information that is provided for display while continuing to provide a second subset of the plurality of information included in the application for display.

2. The display information security system of claim 1, wherein the detecting the first display information protection event includes determining that a power saving action has been performed on the computing device.

3. The display information security system of claim 1, wherein the detecting the first display information protection event includes detecting the performance of a lock action on the computing device.

4. The display information security system of claim 1, wherein the detecting the first display information protection event includes detecting the performance of a sleep action on the computing device.

5. The display information security system of claim 1, further comprising:
   a secure storage system that is included in the computing device and that stores the first display information protection policy, wherein the computing device is configured to authenticate to the secure storage system to retrieve the first display information protection policy.

6. The display information security system of claim 1, wherein the obfuscating the first subset of the plurality of information that is provided for display includes at least one of:
   providing at least one graphical element for display in place of the first subset of the plurality of information that was provided for display; and
   stopping transmission of the first subset of the plurality of information over the network such that only the second subset of the plurality of information is transmitted over the network.

7. An information handling system (IHS), comprising:
   at least one input device;
   a display device connector;
   a database storing a display information protection policy;
   a processing system that is coupled to the at least one input device, the display device connector, and the database; and
   a memory system that is coupled to the processing system and that includes instruction that, when executed by the processing system, cause the processing system to provide a display information protection engine that is configured to:
      provide, via the display device connector, an application that includes a plurality of information for display;
      determine that a first subset of the plurality of information included in the application that has been provided for display is defined by the display information protection policy;
      detect a display information protection event, wherein the detecting the display information protection event includes determining that an amount of time has passed without an input being provided to the at least one input device; and
      obfuscate, in response to determining that the first subset of a plurality of information is defined by the display information protection policy and detecting the display information protection event that includes the determination that the amount of time has passed without an input being provided to the at least one input device, the first subset of the plurality of information that is provided for display while continuing to provide a second subset of the plurality of information included in the application for display.

8. The IHS of claim 7, wherein the detecting the display information protection event includes determining that a power saving action has been performed.

9. The IHS of claim 7, wherein the detecting the display information protection event includes detecting the performance of a lock action.

10. The IHS of claim 7, wherein the detecting the display information protection event includes detecting the performance of a sleep action.

11. The IHS of claim 7, further comprising:
a secure storage system that includes the database that stores the display information protection policy, wherein the display information protection engine is configured to authenticate to the secure storage system to retrieve the display information protection policy.

12. The IHS of claim 7, wherein the obfuscating the first subset of the plurality of information that is provided for display includes at least one of:
providing at least one graphical element for display in place of the first subset of the plurality of information that was provided for display; and
stopping transmission of the first subset of the plurality of information over the network such that only the second subset of the plurality of information is transmitted over the network.

13. The IHS of claim 7, wherein the display information protection engine that is configured to:
receive the display information protection policy from a management server over a network; and
store the display information protection policy in the database.

14. A method for providing event-based display information protection, comprising:
providing, by a computing system through a display device connector, an application that includes a plurality of information for display;
determining, by the computing system, that a first subset of the plurality of information included in the application that has been provided for display is defined by a display information protection policy that is stored in a storage subsystem;
detecting, by the computing system, a display information protection event, wherein the detecting the display information protection event includes determining that an amount of time has passed without an input being provided to at least one input device; and
obfuscating, in response to determining that the first subset of a plurality of information is defined by the display information protection policy and detecting the display information protection event that includes the determination that the amount of time has passed without an input being provided to the at least one input device, the first subset of the plurality of information that is provided for display while continuing to provide a second subset of the plurality of information included in the application for display.

15. The method of claim 14, wherein the detecting the display information protection event includes determining that a power saving action has been performed.

16. The method of claim 14, wherein the detecting the display information protection event includes detecting the performance of a lock action.

17. The method of claim 14, wherein the detecting the display information protection event includes detecting the performance of a sleep action.

18. The method of claim 14, further comprising:
authenticating, by the computing system, with the storage subsystem that stores the display information protection policy in order to retrieve the display information protection policy.

19. The method of claim 14, wherein the obfuscating the first subset of the plurality of information that is provided for display includes at least one of:
providing at least one graphical element for display in place of the first subset of the plurality of information that was provided for display; and
stopping transmission of the first subset of the plurality of information over the network such that only the second subset of the plurality of information is transmitted over the network.

20. The method of claim 14, further comprising:
receiving, by the computing system from a server system through a network, the display information protection policy; and
storing, by the computing system, the display information protection policy in the storage subsystem.

* * * * *